US010158722B2

(12) United States Patent
Eschbach et al.

(10) Patent No.: US 10,158,722 B2
(45) Date of Patent: Dec. 18, 2018

(54) METHOD AND SYSTEMS FOR THE SCHEDULED CAPTURE OF WEB CONTENT FROM WEB SERVERS AS SETS OF IMAGES

(71) Applicants: Jeffrey T Eschbach, Chicago, IL (US); Todd Walter Price, Prairie Grove, IL (US); Stephen Gregory Nazaran, Oak Park, IL (US)

(72) Inventors: Jeffrey T Eschbach, Chicago, IL (US); Todd Walter Price, Prairie Grove, IL (US); Stephen Gregory Nazaran, Oak Park, IL (US)

(*) Notice: Subject to any disclaimer, the term of this patent is extended or adjusted under 35 U.S.C. 154(b) by 341 days.

(21) Appl. No.: 14/815,678

(22) Filed: Jul. 31, 2015

(65) Prior Publication Data
US 2017/0289267 A1 Oct. 5, 2017

(51) Int. Cl.
G06F 15/16 (2006.01)
H04L 29/08 (2006.01)
H04L 29/06 (2006.01)
G06F 9/455 (2018.01)
G06F 17/30 (2006.01)

(52) U.S. Cl.
CPC .......... *H04L 67/142* (2013.01); *G06F 9/4555* (2013.01); *G06F 17/30876* (2013.01); *H04L 67/02* (2013.01); *H04L 67/32* (2013.01); *H04L 67/42* (2013.01)

(58) Field of Classification Search
CPC ..... H04L 67/142; H04L 67/02; H04L 67/327; H04L 67/42
USPC ........................................................ 709/203
See application file for complete search history.

(56) References Cited

U.S. PATENT DOCUMENTS

| 5,781,629 A | 7/1998 | Haber et al. |
| 6,356,934 B1 * | 3/2002 | Delph ............... G06F 17/30873 707/E17.111 |
| 6,571,256 B1 | 5/2003 | Dorian et al. |

(Continued)

FOREIGN PATENT DOCUMENTS

| CN | 102355459 A | 2/2012 |
| GB | 2478554 A | 9/2011 |

(Continued)

OTHER PUBLICATIONS

European Patent Office, Extended European Search Report and Search Opinion, dated May 12, 2017, EPO, Munich, Germany.

(Continued)

*Primary Examiner* — Tauqir Hussain
(74) *Attorney, Agent, or Firm* — Valerie M. Davis; The Mason Group Patent Specialists LLC

(57) ABSTRACT

A method and system for the scheduled capturing of web content from a web server includes a capturing server establishing a link with a client device and receiving over the link from the client device a set of indications for web content to capture and schedule information for capturing the web content. The method further includes performing, in accordance with the schedule information, establishing a network connection with the web server hosting a web resource of the indicated web content, receiving the web resource over the network connection from the web server without the web resource being routed through the client device, and capturing the web resource as a set of images of the web resource loaded into a web browser executing on the capturing server.

19 Claims, 18 Drawing Sheets

(56) References Cited

U.S. PATENT DOCUMENTS

| | | |
|---|---|---|
| 6,792,545 B2 | 9/2004 | Mccreight et al. |
| 7,370,035 B2 | 5/2008 | Gross et al. |
| 7,424,510 B2 | 9/2008 | Gross et al. |
| 7,496,559 B2 | 2/2009 | Gross et al. |
| 7,693,956 B2 | 4/2010 | Moricz |
| 7,945,914 B2 | 5/2011 | Hasiuk et al. |
| 7,966,350 B2 | 6/2011 | Levine et al. |
| 8,019,741 B2 | 9/2011 | Gross et al. |
| 8,037,182 B2 | 10/2011 | Smyth et al. |
| 8,065,414 B2 | 11/2011 | Anastas et al. |
| 8,171,108 B2 | 5/2012 | Shannon et al. |
| 8,566,903 B2 | 10/2013 | Kisin et al. |
| 8,984,390 B2 | 3/2015 | Aymeloglu et al. |
| 9,729,410 B2 | 8/2017 | Eschbach |
| 2001/0047400 A1 | 11/2001 | Coates et al. |
| 2002/0071192 A1 | 6/2002 | Deblanc et al. |
| 2002/0198882 A1* | 12/2002 | Linden ............. G06F 17/30867 |
| 2003/0023664 A1 | 1/2003 | Elmer |
| 2003/0200550 A1* | 10/2003 | Antebi ............. H04L 29/06027 725/109 |
| 2004/0260733 A1 | 12/2004 | Adelstein et al. |
| 2005/0144315 A1 | 6/2005 | George et al. |
| 2007/0011450 A1 | 1/2007 | McCreight et al. |
| 2007/0022296 A1 | 1/2007 | Caverly et al. |
| 2009/0089361 A1 | 4/2009 | Womack et al. |
| 2009/0132640 A1* | 5/2009 | Verma ............. G06F 17/30864 709/203 |
| 2009/0165142 A1 | 6/2009 | Adelstein et al. |
| 2009/0204610 A1 | 8/2009 | Hellstrom et al. |
| 2010/0057864 A1* | 3/2010 | Laird-McConnell ........................ G06F 17/30905 709/206 |
| 2010/0095208 A1 | 4/2010 | White et al. |
| 2010/0202755 A1 | 8/2010 | Araya |
| 2011/0041058 A1 | 2/2011 | Butler et al. |
| 2011/0221766 A1* | 9/2011 | Ko ........................ G06F 3/1208 345/629 |
| 2011/0264677 A1 | 10/2011 | Hermitage et al. |
| 2012/0221633 A1 | 8/2012 | Adelstein et al. |
| 2012/0265802 A1 | 10/2012 | Shen et al. |
| 2012/0290847 A1 | 11/2012 | O'Connor et al. |
| 2012/0303607 A1 | 11/2012 | Moricz et al. |
| 2013/0019149 A1 | 1/2013 | Spencer et al. |
| 2013/0055114 A1* | 2/2013 | Lev ........................ H04W 4/50 715/760 |
| 2013/0133032 A1 | 5/2013 | Li et al. |
| 2013/0166777 A1 | 6/2013 | Chen et al. |
| 2013/0212689 A1* | 8/2013 | Ben-Natan ............. H04L 63/20 726/26 |
| 2013/0254845 A1 | 9/2013 | Soerensen |
| 2014/0118479 A1 | 5/2014 | Rapoport et al. |
| 2014/0173417 A1 | 6/2014 | He |
| 2014/0214919 A1 | 7/2014 | Taylor et al. |
| 2015/0120804 A1 | 4/2015 | Eschbach |
| 2015/0215325 A1* | 7/2015 | Ogawa ............. G06F 17/30091 726/23 |
| 2017/0185368 A1 | 6/2017 | Handrigan et al. |

FOREIGN PATENT DOCUMENTS

| | | |
|---|---|---|
| JP | 2005332188 A | 12/2005 |
| WO | 2002071192 A2 | 9/2002 |
| WO | 2011139583 A1 | 11/2011 |

OTHER PUBLICATIONS

U.S. Patent and Trademark Office, U.S. Appl. No. 14/062,471 Office Action, dated Sep. 23, 2015, USPTO, Alexandria, United States.

U.S. Patent and Trademark Office, U.S. Appl. No. 14/062,471 Office Action, dated May 6, 2016, USPTO, Alexandria, United States.

U.S. Patent and Trademark Office, U.S. Appl. No. 14/062,471 Office Action, dated Oct. 18, 2016, USPTO, Alexandria, United States.

David W. Hagy, Investigations Involving the Internet and Computer Networks, National Institute of Justice Special Report, Jan. 2007, U.S. Department of Justice, Washington DC, USA.

Depot-web.com is a service of legal Web capture.

NPL_www_archive_org.

NPL_www_archivesocial_com.

NPL_www_awesomescreenshot_com.

NPL_www_backupify_com.

NPL_www_cloudpreservation_nextpoint_com.

NPL_www_dei_ca.

NPL_www_digistamp_com.

NPL_www_es_wikipedia_org.

NPL_www_evernote_com.

NPL_www_freezepage_com.

NPL_www_globalcolleague_com.

NPL_www_nextpoint_com.

NPL_www_pagefreezer_com.

NPL_www_sertify_com.

NPL_www_surety_com.

NPL_www_symantec_com.

NPL_www_techsmith_com.

NPL_www_trademarkia_com.

NPL_www_veresoftware_com.

NPL_www_verisign_com.

NPL_www_x1_com.

Shane Thomas, PCT International Search Report, dated Apr. 6, 2015, Alexandria, Virginia, United States of America.

Shane Thomas, PCT Written Opinion of the International Searching Authority, dated Apr. 6, 2015, Alexandria, Virginia, United States of America.

Wayback Engine library of archived websites.

U.S. Patent and Trademark Office, U.S. Appl. No. 14/815,638 Office Action, dated Dec. 7, 2017, USPTO, Alexandria, United States.

* cited by examiner

| http://finance.yahoo.com | Adim Home Find Friends |

Recent
Quotes you view appear 61 Comments
here for quick access
Sign In to post a comment
Quote Lookup | Go Finance Home
My Portfolio       Popular Now   Newest   Oldest   Most Replied
My Quotes News                         *808*
Market Data        Michael 2 hour ago          👍 9   💬 1
Yahoo Originals    Flock, here is what comes out of a typical barrel of crude:
Business & Finance
Personal Finance   Enough liquefied gases (such as propane) to fill 12bsmall (14.1 ounce) cylinders for home, camp-
CNBC               ing or workshop use.
Contributors       Enough gasoline to drive a medium sized car (17 miles per gallon) over 280 miles
                   More Expand Replies (5)    Reply Recommended Games  BWINKLEJMOOSE 3 hour ago          👍 8   💬 1
                   At last- an intelligent discussion. There are a whole lot of ways to blead oil. unfortunately the in-
                   dustry is lacking proper controls for what an ethical blend is. Ethical blending means that you at-
                   tempt to replicate the cut profile of whatever barrel you are modeling. It also means you don't slip
                   in gas liquids or used motor or vegetable oil. Finally, it means that you test the blends for compati-
                   bility using standard test. the industry is trying to get control of blending through the Crude Oil
More games >>      More Compare Brokers    Expand Replies (5)    Reply Speak 2 hour ago           👍 8   💬 4
                   There is always a hidden game being played that people simply don't know about. The game here
                   is that the oil companies want the pipelines because it is far and away a more efficient, safe, and
                   reliable form of transporting crude. Buffet and others are in favour of collecting money the old fash-
                   ioned way, that is to say extortion. Buffet put a billion dollars in the railroads because he knows he
                   can capture a transportation profit on oil. The dirty secret is that this will do three things.first it
                   more Comments Expanded

METHOD AND SYSTEMS FOR THE SCHEDULED CAPTURE OF WEB CONTENT FROM WEB SERVERS AS SETS OF IMAGES

FIELD OF THE DISCLOSURE

The present disclosure relates generally to capturing web content from web servers and more particularly to a client device selecting a web resource hosted by a web server to capture as a set of images in accordance with a schedule.

BACKGROUND

As the proliferation of computer technology increases, so does the volume of data that is shared electronically over computer networks. Presently, digital media is already the dominant format by which information is disseminated, and the Internet continues to grow exponentially. For the most part, web content that exists in the cloud is beneficial, but as with all things, there is a portion that foments controversy. With increasing frequency, web content is playing a role in judicial proceedings, often in support of, or as the focus of, litigation. In either case, it becomes necessary to gather web content in discovery to serve as evidence for trials. An e-mail, for example, might prove the existence or terms of a contract; an Internet video might show criminal behavior; a defamatory comment might be libelous; or a product webpage might provide proof of trademark infringement.

With the capture of web content for evidentiary purposes still in its infancy, capturing and archiving a wide variety of content that is based on diverging technology standards presents difficulties that need to be overcome. Further complicating matters are stringent requirements codified by different judicial bodies at the federal, state, and local levels regarding the qualification of submitted evidence. Electronic evidence must be properly authenticated, and the method by which it is obtained must provide acceptable assurances of data integrity.

BRIEF DESCRIPTION OF THE FIGURES

The accompanying figures, where like reference numbers refer to identical or functionally similar elements throughout the separate views, form part of the specification and illustrate embodiments in accordance with the included claims.

FIGS. 8A and 8B show captured images illustrating the effect of expanding web content for capture, in accordance with some embodiments.

FIGS. 10A and 10B show captured images illustrating the effect of blocking rollovers during capture, in accordance with some embodiments.

FIGS. 13A and 13B show captured images illustrating the effect of applying a comparative algorithm to three pairs of portions of a webpage, in accordance with some embodiments.

Figure 1:
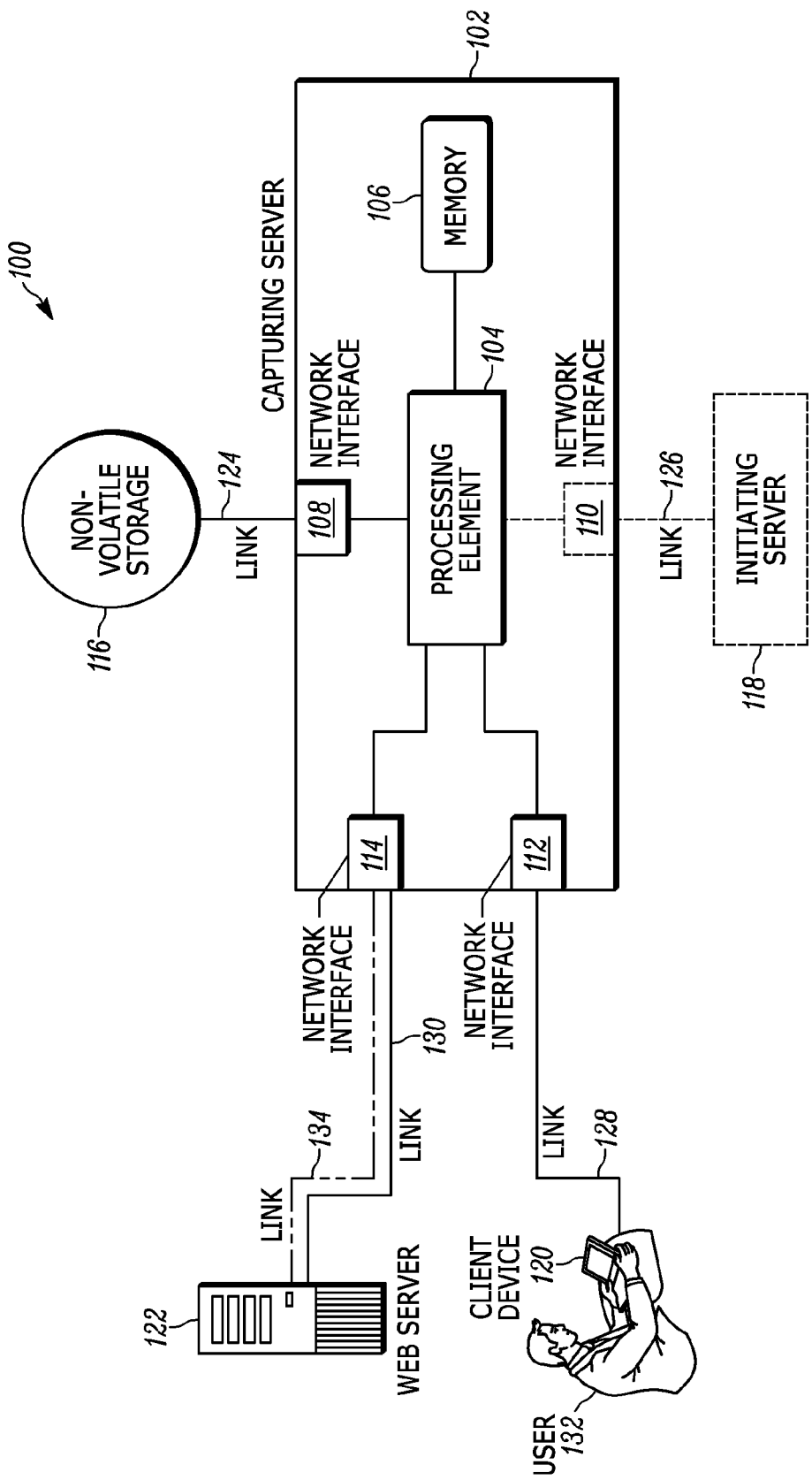
FIG. 1 shows a block diagram of a system for capturing web content as a set of images, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

System, apparatus, and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and system for the scheduled capture of web content from a web server to a non-volatile storage device as a set of images for later retrieval. The method and system allow for a client device to select and schedule the web content for capture while maintaining data integrity by excluding the client device from a chain of custody for the captured web content. Excluding a client device from a chain of custody for captured web content means that a capturing server captures web content from a data stream that carries the web content from a web server to the capturing server without the data stream being routed through the client device.

More specifically, in accordance with the teachings herein, a method performed by a capturing server for scheduled capturing of web content includes establishing a link with a client device and receiving over the link from the client device a set of indications for web content to capture and schedule information for capturing the web content. The method further includes performing, in accordance with the schedule information, establishing a first network connection with a first web server hosting a first web resource of the indicated web content, receiving the first web resource over the first network connection from the first web server without the first web resource being routed through the client device, and capturing the first web resource as a first set of images of the first web resource loaded into a web browser executing on the capturing server.

Also in accordance with the teachings herein, a capturing server configured to schedule capture of web content includes a first network interface configured to establish a link with a client device, a second network interface configured to establish a first network connection with a web server, and a processing element operatively coupled to the first and second network interfaces. The processing element is configured to establish the link with a client device and receive over the link from the client device a set of indications for web content to capture and schedule information for capturing the web content. The processing element is further configured to, in accordance with the schedule information, establish the first network connection with the web server hosting a web resource of the indicated web content, receive the web resource over the first network connection from the web server without the web resource being routed through the client device, and capture the web resource as a set of images of the web resource loaded into a web browser executing on the capturing server.

Further in accordance with the teachings herein, the capturing server includes a third network interface configured to establish a second network connection to a network storage device remotely located from both the capturing server and the client device. The processing element of the capturing server is additionally configured to establish the second network connection between the network storage device and the capturing server and send the captured web resource over the second network connection to be stored on the network storage device.

Referring now to the drawings, and in particular FIG. 1, a web content capturing system (also referred to herein as a capturing system or simply a system) consistent with some embodiments of the present teachings is shown and indicated at 100. The capturing system 100 includes a capturing server 102, a client device 120, a web server 122, non-volatile storage 116, and an optional initiating server 118. The capturing server 102 includes: a processing element 104, memory 106, and network interfaces 108, 110, 112, 114. As shown, the capturing server 102 is coupled from the network interfaces 108, 112, and 114 to similar interfaces on the non-volatile storage 116, the client device 120, and the web server 122 by links 124, 128, and 130, respectively.

In an optional configuration, as indicated by continuously dashed lines, the capturing server 102 is also coupled from the network interface 110 to the initiating server 118 by a link 126. At a later time, as indicated by an intermittently dashed line, after the links 128 and 130 are taken down, a link 134, between the network interface 114 and the web server 122 is established in accordance with schedule information received from the client device 120 over the link 128.

A limited number of system and server components 102, 104, 106, 108, 110, 112, 114, 116, 118, 120, 122, 124, 126, 128, 130, 134 are shown at 100 for ease of illustration, but other embodiments may include a lesser or greater number of such components in a capturing system or capturing server of the system. Moreover, other components needed for a commercial embodiment of a capturing system or a capturing server that incorporates the components shown at 100 are omitted from FIG. 1 for clarity in describing the enclosed embodiments.

We now turn to a brief description of the components 102 116, 118, 120, 122, 124, 126, 128, 130, and 134 within the capturing system 100 and of the components 104, 106, 108, 110, 112, and 114 within the capturing server 102. In general, the capturing server 102, or more specifically, the processing element 104 within the capturing server 102, is configured with functionality in accordance with embodiments of the present disclosure as described in detail below with respect to the remaining figures. "Adapted," "operative," "capable" or "configured" means that the indicated components are implemented using one or more hardware elements such as one or more operatively coupled processing cores, memory elements, and interfaces, which may or may not be programmed with software and/or firmware as the means for the indicated components to implement their desired functionality. Such functionality is supported by the other hardware shown in FIG. 1, including the components 106, 108, 110, 112, 114, 116, 118, 120, 122, 124, 126, 128, 130 and 134.

The processing element 104 represents one or more processing cores and includes arithmetic logic and registers necessary to perform the digital processing, in whole or in part, required by the capturing server 102 to capture web content in accordance with schedule information and operate in a manner consistent with the embodiments described herein. For one embodiment, the processing element 104 represents a primary microprocessor, also referred to as a central processing unit (CPU), of the capturing server 102. In another embodiment, the processing element 104 is an ancillary processor, separate from the CPU, wherein the ancillary processor is dedicated to providing additional processing capability, in whole or in part, needed for components of the capturing server 102 to perform at least some of their intended functionality. For a particular embodiment, the processing element 104 is implemented as a system-on-chip (SoC).

The memory 106 provides storage of electronic data used by the processing element 104 in performing its functionality. For example, the processing element 104 can use the memory 106 to load programs and/or store files associated with the scheduled capturing of web content. In one embodiment, the memory 106 represents random access memory (RAM). In other embodiments, the memory 106 represents volatile or non-volatile memory. For a particular embodiment, a portion of the memory 106 is removable. For example, the processing element 104 can use RAM to cache data while it uses a micro secure digital (microSD) card to store files associated with capturing web content.

The network interfaces 108, 110, 112, and 114 are points of interconnection that couple the capturing server 102 to the network or networks to which the non-volatile storage 116, the initiating server 118, the client device 120, and the web server 122, respectively, are connected. In an embodiment with fewer network interfaces, one or more network interfaces are shared among two or more of the components 116, 118, 120, and 122. The network interfaces 108, 110, 112, 114 can be wireless interfaces, wired interfaces, or a combination of the two. An example of a wireless network interface is a wireless local area network (WLAN) transceiver. An example of a wired interface is an RJ-45 socket configured to accept category 5 (CAT5) or category 6 (CAT6) Ethernet cable.

The links 124, 126, 128, 130 and 134 represent "communication conduits" between components of the capturing system 100, or more specifically, wired or wireless connections (e.g., Ethernet connections) that allow coupled components to exchange data and/or control signals. Each link can be a single connection or include multiple connections of varying types. Multiple connections, for example, can create a chain of intermediary devices such as proxy servers, base stations, access points, or other network devices (not shown) that form a link shown between two components of the system 100. The connections, in turn, utilize one or more technologies to communicate data and/or control signals. These technologies can include, but are not limited to Worldwide Interoperability for Microwave Access (Wi-MAX), Wi-Fi, fourth-generation Long Term Evolution (4G LTE), fixed wireless (e.g., Motorola Canopy), Integrated Services Digital Network (ISDN), Broadband ISDN (B-ISDN), Digital Subscriber Line (DSL), and Synchronous Optical Networking (SONET).

Under the direction of the client device 120, while the client device 120 is being operated by a user 132 (also referred to herein as a subscriber), the capturing server 102 is configured to execute a web browsing session with the web server 122 to allow the client device 120 to browse web content and select a web resource being hosted by the web server 122 for capture. At a later time, in accordance with schedule information received from the client device 120, the capturing server 102 is configured to capture the web resource as a set of images, which is stored to the non-volatile storage 116.

Web content is defined herein as data that is accessible to a computer or computing device that is connected to a network of computing devices (e.g. a LAN), or a network of such networks (e.g., the Internet). Web content includes textual, visual, and/or aural data that is formatted and hosted by one or more content servers (e.g., the web server 122). Web content includes, but is not limited to, data that is formatted as: documents, applications, text, pictures, videos, movies, music, e-services, and/or e-mails. In some instances, web content is integrated into one or more interactive documents (e.g., webpages) that are hosted by a content server and browsable by a client device.

A web resource is a portion of or a collection of web content that is captured together as a unit. A web resource can be a subset of web content, or equivalently, web content can be a set of one or more web resources. A set may have only a single element or include multiple elements. Further, a web resource need not be a proper or strict subset of web content. A web resource can include some or all of the web content specified for capture by a set of indications. For example, the capturing server 102 receives a set of indications from the client device 120 which specifies web content to capture. The web content can be a single webpage to capture as a single web resource from a single web server, or the web content can include multiple webpages to capture as different web resources from different web servers. A web resource can also be a collection of web content captured together. For example, a webpage selected for capture is a web resource which includes different types of content, namely text, graphics, and an embedded video.

The terms "web content" and "web resource" are sometimes used interchangeably. Capturing web content, for example, can mean capturing a single web resource or capturing multiple web resources. Capturing a web resource can also mean capturing web content in the sense that web resources include web content.

Additionally, web content includes both deep web content and surface web content. Deep web content is not crawlable (i.e., cannot be found by programs commonly referred to as web bots, crawlers, or spiders) and thus not indexed by standard search engines such as Google or Yahoo!. In one instance, deep web content is stored in searchable databases that only produce results dynamically in response to a direct request from an authorized client. For example, a bank server will only provide an account balance to an account holder who has been authenticated through the use of a password and a personal identification number (PIN). In another instance, deep web content is dynamically generated in response to interactive input. For instance, an algorithm run by a content server may provide diagnostic information to a mechanic who provides responses to a series of pre-programmed inquiries.

Facebook, Twitter, and LinkedIn serve as examples of social media sites that include deep web content. A user browsing to a social media site might access deep web content by "clicking" a radio button, entering text into a field, expanding content so hidden text becomes visible, or scrolling to generate more displayed content (e.g., expand a timeline in Facebook). Clicking and checking mean to select using a mouse, stylus, or other input device (e.g., tapping a touch screen using a finger).

In contrast to deep web content, surface web content is static content hosted by a web server that is indexable by standard search engines and accessible to a web browser (also referred to herein simply as a browser) executing on a client device through the use of a uniform resource locator (URL) without the need for further interaction. For example, navigating to the URL www.whitehouse.gov brings up a static webpage that displays surface web content relating to the office of the President. Any additional web content requiring further user input to obtain and display within the webpage represents deep web content.

The client device 120 is any electronic device capable of establishing a network connection with another network-accessible electronic device hosting or browsing web content. A non-exhaustive list of examples for client devices includes: desktop computers, laptops, tablets, phablets, smartphones, wearable computing devices, personal digital assistants (PDAs), and Internet-capable televisions.

The web server 122 hosts web content that is accessible via a network to other electronic devices configured to browse web content. The web server 122 is any electronic device capable of establishing a network connection and hosting web content that it provides to other networked devices, such as the capturing server 102 or the client device 120, in response to requests received from those devices. In one embodiment, the web server 122 represents one or more dedicated machines or scalable structures that host commercial, educational, or governmental web content. In another embodiment, the web server 122 represents a personal computer that, through the installation of specialized software (e.g., Apache HTTP Server), hosts a personal webpage or website. In a further embodiment, the web server 122 provides a virtual gaming environment that allows geographically separated users to participate in a shared gaming experience.

The non-volatile storage 116, also referred to herein as the non-volatile storage device 116, provides the capturing server 102 with long-term storage for the web content the capturing server 102 captures from the web server 122 and other content servers. Long-term storage can span multiple days, weeks, months, or years. For different embodiments, the non-volatile storage 116 is a magnetic (e.g., hard drive or tape), a solid state (e.g., SSD or flash memory), or an optical (e.g., writable DVD or holographic) storage device. In some embodiments, the non-volatile storage 116 is co-located with or physically integrated into the capturing server 102. In other embodiments, the non-volatile storage 116 is remote to (not co-located with) the capturing server 102, as shown. In further embodiments, the non-volatile storage 116 represents multiple storage devices of the same or different types that are located together or apart from one another. For all embodiments, the non-volatile storage 116 is remote to (located apart from) the client device 120. In some embodiments, the non-volatile storage device 116 is a network storage device.

The term "capture" refers to the capturing server 102 storing a copy of web content hosted by the web server 122, or other content server, to the non-volatile storage 116 as one or more sets of images. In one embodiment, the capturing server 102 captures web content from multiple webpages. In another embodiment, the capturing server 102 captures web content from multiple web servers, for example, when the multiple webpages are hosted by different web servers. For a different embodiment, different portions of a webpage are hosted by and captured from different web servers. A webpage hosted by the web server 122, for example, includes imbedded images which are hosted by and captured from a different web server. In a further embodiment, the capturing server 102 uses Hypertext Transfer Protocol (HTTP) and/or File Transfer Protocol (FTP) to get web content for capture from the web server 122.

Capturing web content for some embodiments includes storing the web content with additional information, such as metadata, which is described in greater detail below. Capturing a webpage can include the capturing server 102 storing one or more screenshots of the entire webpage, or it might include the capturing server 102 storing images for only a portion of the webpage being actively displayed by a web browser. Web content that is captured by the capturing server 102 is made available for later viewing by authorized users. For example, an authorized user recalls captured web content, upon entering his password, through a publically available URL using any Internet-accessible client device. In a particular embodiment, the user 132 retrieves the captured web content on a different calendar date from when the web content was captured.

For several embodiments, the initiating server 118 is configured to initialize the capturing server 102 and to provide a set of identifiers to at least one of (i.e., one or more of) the capturing server 102 or the client device 120. The set of identifiers is configured to allow the establishment of the link 128, between the capturing server 102 and the client device 120. Some embodiments relate to multiple client devices scheduling the capture of independent web resources from multiple web servers at different times. The client device 120 might be scheduling the capture of web content from the web server 122 for a trademark infringement case while another client device is scheduling the capture of different web content from another web server for use in a defamation lawsuit. For multiple client devices, a single capturing server (e.g., capturing server 102) might capture the web content indicated and scheduled by the multiple client devices. Alternatively, separate capturing servers, one for each client device, might be used within the system 100 so that each capturing server captures only the web content indicated and scheduled by a single client device.

For embodiments where there is a one-to-one correspondence between capturing servers and client devices, the initiating server 118 initializes a capturing server for each client device as a need arises. For example, the initiating server 118 initializes the capturing server 102 as the client device 120 logs on to or otherwise identifies to the initiating server 118 its intent to use the system 100 to indicate and schedule web content for capture. From an Internet Protocol (IP) address or login information, the initiating server 118 recognizes that the client device 120 or the user 132, respectively, is associated with a subscriber who is authorized (e.g., through a paid subscription) to use the system 100 to capture web content.

For a particular embodiment, the initiating server 118 initializes the capturing server 102 when the initiating server 118 receives an indication that the client device 120 is ready to use the capturing system 100 to indicate and schedule web content for capture. For example, the indication is provided when the client device 120 initiates a capture mode. For instance, the initiating server 118, using an Internet connection (not shown) initializes the capturing server 102 by creating a virtual machine using a service that hosts virtual machines, which run in the cloud. Cloud computing refers to computational resources that are provided by a third party and made available over one or more Internet connections. Google Cloud Platform (GCP), for example, allows for the creation of virtual machines using Google's infrastructure. Amazon Elastic Compute Cloud (EC2) and Windows Azure also allow for the creation of virtual machines using Amazon's and Microsoft's cloud computing platforms, respectively.

The virtual machine the initiating server 118 creates in the cloud for the client device 120 becomes the capturing server 102, which runs its own operating system independently from other virtual machines the initiating server 118 creates for other client devices. For an embodiment, the initiating server 118 also provides software for execution on the virtual machine that allows the virtual machine to perform its functionality as described herein. For embodiments where the capturing server 102 is a virtual machine, the hardware components 104, 106, 108, 110, 112, 114 used by the capturing server 102 represent hardware components of the platform hosting the virtual machine (e.g., hardware components within the Google, Amazon, or Microsoft servers).

After the initiating server 118 initializes the capturing server 102 by creating it as a virtual machine, or making it ready for use if already created, the initiating server 118 provides identifiers to one of or a combination of the capturing server 102 and/or the client device 120. This allows the capturing server 102 and the client device 120 to communicatively couple by forming the link 128, enabling the client device 120 to control a web browsing session executing on the capturing server 102. As the client device 120 directs the capturing server 102 to the web server 122, the capturing server 102 creates the link 130. The client device 120 then indicates a web resource hosted by the web server 122 to capture and provides schedule information by which to capture the web resource.

For one embodiment, the initiating server 118 provides the client device 120 with an identifier (e.g., an IP address) for the capturing server 102. Responsively, the client device 120 initiates the link 128 with the capturing server 102. For another embodiment, the capturing server 102 receives an identifier for the client device 120 from the initiating server 118 and responsively initiates the link 128.

For some embodiments, the initiating server 118 creates a number of virtual machines before they are needed by a client device. This creates "headroom" within the capturing system 100 that allows the system 100 to respond faster when a virtual machine is needed by a client device. As the capturing server 102 is created as a virtual machine when needed by the client device 120, it is also taken down again when it is no longer needed by the client device 120.

For a particular embodiment, virtual machines are created to capture web content for a single client and not used to capture web content for multiple clients. Providing each client with a newly created capturing server having fresh software ensures a higher level of security against hacking, data manipulation, malicious code, and other undesirable occurrences. This results in greater data integrity for scheduled captures. In an alternate embodiment, virtual machines are reused to capture the same or different web resources at different times, but only with respect to the same client (e.g., as identified by an IP address or login information). This allows the virtual machine to retain and use subscriber-specific information for future capturing sessions. Always assigning a virtual machine back to the same client greatly reduces the chance of an unauthorized user having access to the virtual machine before, during, or after a capturing session.

Figure 2:
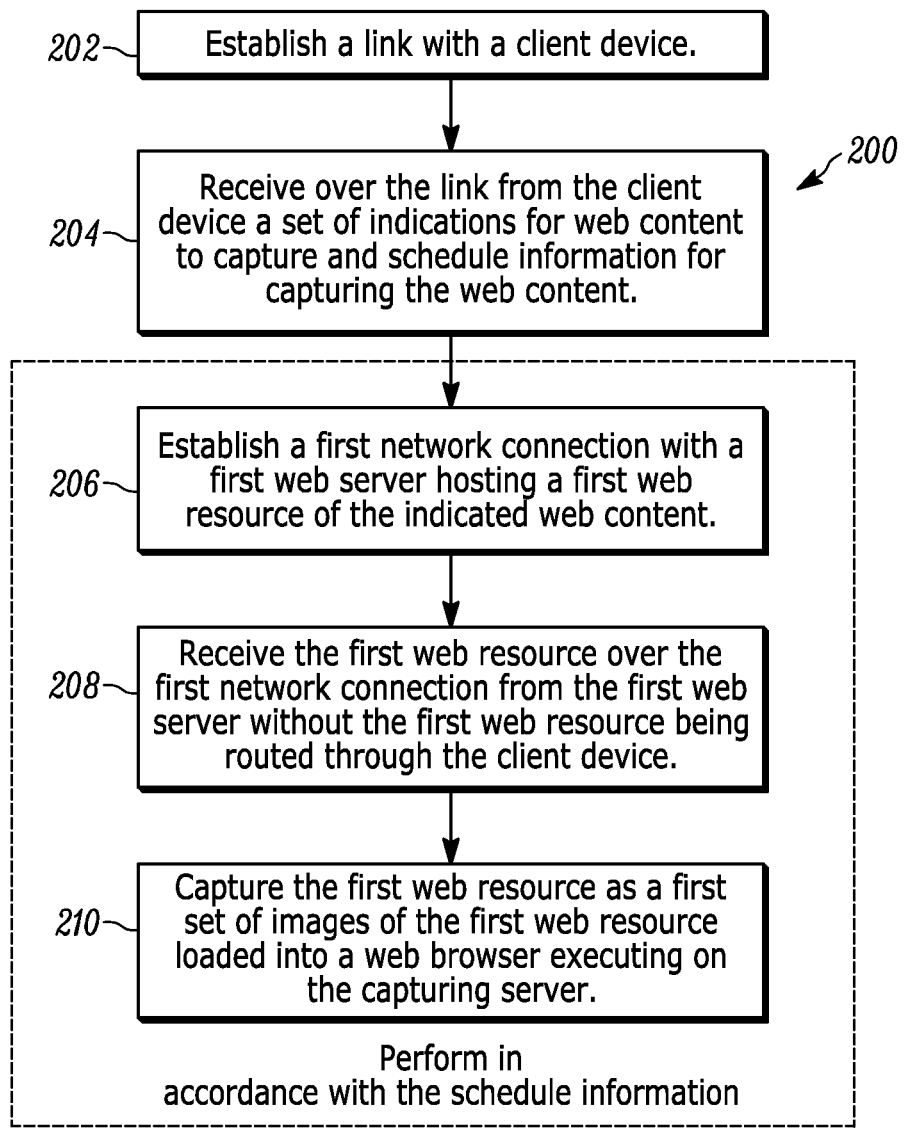
FIG. 2 shows a logical flow diagram illustrating a method for the scheduled capture of a web resource as a set of images, in accordance with some embodiments.

We turn now to a detailed description of the functionality of the system components shown in FIG. 1 in accordance with the teachings herein and by reference to the remaining figures. FIG. 2 shows a logical flow diagram illustrating a method 200 performed by the capturing server 102 to capture indicated web content in accordance with schedule information as a set of images. Generally, the client device 120 executes a remote control protocol (RCP) that allows the client device 120 to control a web browsing session established between the capturing server 102 and the web server 122. An RCP is a protocol and/or an application that allows the user 132 of the client device 120 to remotely control a web browser executing on the capturing server 102. In different embodiments, different RCPs may be used which are associated with different sets of standards and/or software developers. The client device 120 remotely controlling a web browsing session established between the capturing server 102 and one or more web servers to select web content for scheduled capture is referred to herein as a first web browsing mechanism.

Specifically, the capturing server 102 establishes 202 the link 128 with the client device 120 to allow the client device 120 to remotely control a web browsing session between the capturing server 102 and the web server 122 to browse web content and select web content for scheduled capture. The client device 120 selects web content by specifying web resources to capture as the client device 120 navigates to the web resources. As indicated previously, the link 128 is initiated by the capturing server 102 in some embodiments and initiated by the client device 120 in other embodiments. For a particular embodiment, the client device 120 executes Remote Desktop Protocol (RDP), a proprietary remote control protocol developed by the Microsoft Corporation that provides a graphical interface on the client device 120 to facilitate the user 132 remotely controlling the web browsing session between the capturing server 102 and the web server 122.

The capturing server 102 establishes the web browsing session between itself and the web server 122 using a web browser. The web browser executes on the capturing server 102, and the link 130 supports the web browsing session. For different embodiments, the web browsing session supports both the simple object access protocol (SOAP), the representational state transfer (REST) web service protocol, or other web "surfing" paradigms. A session is defined herein as a semi-permanent interactive information interchange or "dialog" between two computing devices to accomplish a specific objective, which in this case is web browsing.

By this definition, a session, specifically a remote control session, is running between the client device 120 and the capturing server 102. The link 128 supports the remote control session, which runs contemporaneously with the web browsing session supported by the link 130. Using the remote control session, the client device 120 directs the capturing server 102, or more specifically, the web browser executing on the capturing server 102, to browse web content hosted by the web server 122, and for some embodiments, also other web servers. As the web browser navigates web content hosted by the web server 122 for a particular embodiment, the capturing server 102 receives the web content from the web server 122 without the web content being routed through the client device 120.

For some embodiments, different web browsing mechanisms allow the client device 120 to select web content hosted by web servers for scheduled capture. Using a second web browsing mechanism, for example, the client device 120 launches a web browser and establishes a web browsing session between itself and the web server 122, which is supported by the links 128 and 130. Session traffic, which includes the transfer of web content hosted by the web server 122, is directed (i.e., routed) to pass through the capturing server 102.

For a third web browsing mechanism, the capturing server 102 executes both a web browser and a content server. In total, two web browsing sessions are running contemporaneously: a first web browsing session between the client device 120 and the capturing server 102, supported by the link 128, and a second web browsing session between the capturing server 102 and the web server 122, supported by the link 130. Also, both the web server 122 and the capturing server 102 host the same web content. The capturing server 102 executes a web browser (e.g., Firefox, Internet Explorer, Opera, Google Chrome, etc.) to browse the web server 122. The capturing server 102 also executes a content server (e.g., Apache HTTP Server, Nginx, Lighttpd, etc.) to host the web content it receives from the web server 122 for redisplay back down to the client device 120.

Using the first web browsing session, the client device 120 browses the web content hosted by the capturing server 102. The webpages constructed by the capturing server 102 using its content server are recreations of the webpages hosted by the web server 122. As the client device 120 browses (i.e., clicks on) links embedded within the webpages hosted by (the content server of) the capturing server 102, the capturing server 102 uses the second web browsing session to retrieve the selected content from the webpages hosted by the web server 122 and replicate the content in its own webpages.

A benefit of the first and third web browsing mechanisms is a mitigated risk of exposing the client device 120 to malicious code and/or spyware as a result of browsing web content for capture. Using the first web browsing mechanism, for example, the client device 120 remotely controls a web browsing session between the capturing server 102 and the web server 122. Web content hosted by the web server 122 is downloaded to the capturing server 102. From the capturing server 102, image data representing the web content, and not the actual web content, is downloaded to the client device 120 to support a graphical interface of the RCP executing on the client device 120.

With an RCP executing on the client device 120 for the first web browsing mechanism, or a web browser executing on the client device 120 for the second and third web browsing mechanisms, the user 132 uses the client device 120 to browse web content hosted by web servers, including the web server 122. As the user 132 browses and views web content, he decides which web content to capture. For example, the user 132 browses to a first web resource hosted by the web server 122 and decides to schedule one or more captures of the web resource. The user 132 clicks on a virtual button or icon as he is viewing the first web resource, and the client device 120 responsively presents the user 132 with a scheduling dialog box for the first web resource. The user 132 populates fields in the scheduling dialog box to communicate to the client device 120 when the first web resource is to be captured. The client device 120, in turn, communicates this information to the capturing server 102.

The capturing server 102 receives 204 from the client device 120, over the link 128, a set of indications for web content to capture and schedule information for capturing the web content. In particular, the set of indications includes an indication to capture the first web resource, and the schedule information includes a schedule for capturing the first web resource.

In a further embodiment, the user 132 additionally selects for scheduled capture a second web resource hosted by a second web server, different from the web server 122. The user 132 provides the client device 120 with schedule information for capturing the second web resource, different from the scheduling information for capturing the first web resource. In this case, the set of indications for web content to capture and the schedule information for capturing the web content, received by the capturing server 102 from the client device 120, also includes an indication to capture the second web resource and a schedule for capturing the second web resource.

For a particular embodiment, while the link 128 allows the client device 120 to remotely control the web browsing session between the capturing server 102 and the web server 122, the capturing server 102 receives the set of indications for web content to capture as the client device selects the web content using the web browsing session. For a further embodiment, the capturing server 102 receives an indication for each web resource to capture as the client device 120 navigates, using the web browsing session, to the web resource and indicates the web resource for capture.

For example, the user 132 uses the client device 120 to navigate a web browser executing on the capturing server 120 to a webpage being hosted by the web server 122. The user 132 provides an indication to the client device 120 to capture the webpage or the website to which the webpage belongs. The client device 120 then sends an indication to the capturing server 102 to capture as a first web resource either the webpage or the website. The capturing server 102 further receives an indication to capture a second web resource after receiving the indication to capture the first web resource and after the user 132 navigates the web browser executing on the capturing server 120 to a second web server hosting the second web resource.

In some embodiments, the user 132 uses the client device 120 to indicate one or more web resources to capture without navigating the web browser executing on the capturing server 120 to the one or more web resources. For example, the user 132 navigates the web browser to a webpage for a first of his two state senators and provides an indication to the client device 120 to capture the webpage. The user 132 decides to also provide an indication to capture a webpage for a second of his two state senators. Instead of navigating the web browser executing on the capturing server 102 to the webpage for the second senator, the user 132 simply uses the client device 120 to enter a URL for the webpage for the second senator. The resulting set of indications the capturing server 102 receives 204 from the client device 120 includes indications to capture the webpages for both state senators.

As an alternative to remotely controlling a web browsing session between the capturing server 102 and web servers hosting web resources, the user 132 specifies the set of indications for web content to capture by entering into the client device 120 a URL for each web resource the user 132 wishes to capture. For example, the user 132 can pull up a dialog box on the client device 120 and use a keyboard of the client device 120 to type into the dialog box the individual URLs for the web resources the user 132 wishes to capture. The client device 120 then communicates the URLs over the link 128 to the capturing server 102 as the set of indications for web content to capture. The user 132 can enter schedule information for each URL independently, or the user 132 can provide a schedule to the client device 120 that governs the capture of multiple URLs. The client device 120 communicates the schedule information to the capturing server 102 with or separately from the set of indications.

After receiving 204 the set of indications for web content to capture and the schedule information for capturing the web content, the capturing server 102 captures the web content in accordance with the schedule information. For example, seven days have passed since the capturing server 102 received the set of indications which included an indication to capture the first web resource from the web server 122 in a week's time, making the current time the scheduled time to capture the first web resource.

The capturing server establishes 206 a first network connection with the web server 122 by initiating the link 134 between the capturing server 102 and the web server 122 to support the network connection. The link 134 is initiated because the link 130 no longer exists. The link 130 and the link 128 were taken down the previous week after the user 132 used the client device 120 to select the first web resource for scheduled capture.

Using the first network connection, the capturing server 102 requests and receives 208 the first web resource from the web server 122. The first web resource is received by the capturing server 102 without the first web resource, specifically, the data stream transmitting the first web resource, being routed through the client device 120. Therefore, the client device 120 is unable to interact with or alter the first web resource as it is transmitted from the web server 122 to the capturing server 102.

Upon receiving the first web resource, the capturing server 102 captures 210 the first web resource as a first set of images. The capturing server 102 captures the first web resource as it appears loaded on a web browser executing on the capturing server 102.

In a further embodiment, the set of indications the capturing server 102 receives 204 from the client device 120 also includes an indication to capture a second web resource from a second web server in two week's time. Fourteen days after receiving the set of indications, the capturing server 102 establishes a second network connection with the second web server, receives the second web resource over the second network connection from the second web server, and captures the second web resource as a second set of images of the second web resource loaded into a web browser executing on the capturing server 102. As the web server 122 did with the first web resource, the second web server does not transmit the second web resource through the client device 120 as it is being sent to the capturing server 102.

The capturing server 102 captures web resources as a set of images by storing the set of images to the non-volatile storage 116. Each image of the set of images is visual representation of how the captured web resource appears loaded in a web browser executing on the capturing server 102. The images are sometimes described as screenshots of screens being displayed on the web browser executing on the capturing server 102. In some instances, however, the capturing server 102 does not include a display, or if it does include a display, the capturing server 102 is not using it to show the web browser it is executing. In these instances, an image or screenshot refers to a visual representation of how a web resource is loaded in the web browser existing within the registers of the processing element 104 and in memory 106. It is how the web resource would appear on a screen of a display if the display were connected to the capturing server 102 and being used to show the web browser.

Capturing a web resource as a set of images means that at least a portion of the web resource is stored to non-volatile storage as one or more image files that include digital data that can be rasterized or otherwise adapted (e.g., from raw or vector formats) for visual presentation, such as on a display or printer. A non-exhaustive list of image files includes Joint Photographic Experts Group (JPEG), Tagged Image File Format (TIFF), Graphics interchange Format (GIF), Portable Network Graphics (PNG), Bitmap (BMP), Camera Image File Format (CIFF), Digital Negative (DNG), Scalable Vector Graphics (SVG), Portable Document Format (PDF), and Encapsulated Postscript (EPS) files. As defined herein, image files include video file formats. This is based on the reasoning that a video or a movie is an ordered set of images displayed in succession. Therefore, a web resource can be captured as a set of images using Moving Picture Experts Group (MPEG), Matroska (MKV), Flash Video (FLV), Video Object (VOB), "Ogging" (OGG), and Audio Video Interleaved (AVI) container formats, for example.

In some instances, web content hosted by a particular web server is inaccessible to the capturing server 102 based on attributes relating to the capturing server 102. Such attributes might include, but are not limited to, an Internet service provider (ISP) for the capturing server 102, an IP address of the capturing server 102, cookies exchanged with the capturing server 102, or credentials supplied by the capturing server 102. For example, the capturing server 102 and the web server 122 are located in different countries such that web content being hosted by the web server 122 is not accessible to the capturing server 102 given the capturing server's location-dependent IP address. The web content hosted by the web server 122 is geo-restricted, and the capturing server 102 is automatically blocked. The capturing server 102 can bypass such regional restrictions in a number of ways.

For a first embodiment, a capturing session for the client device 120 is transferred from the capturing server 102 to another capturing server having a more favorable geographic location when the capturing server 102 is geo-blocked from web content based on its IP address. Another link is established between the client device 120 and the other capturing server. The capturing session is then transferred to this other link either temporarily or for the duration of the capturing session. Depending upon whether this transfer is permanent or temporary, the link 128 may or may not be taken down.

For a second embodiment, the capturing server 102 routes a request for geo-restricted web content, from which the capturing server 102 is blocked, through another capturing server in a more favorable geographic location. An alternate link to the link 130 is established so that the other capturing server is communicatively coupled between the capturing server 102 and the web server 122 hosting the geo-restricted web content. The capturing server 102 directs the request for web content to the other capturing server, and the other capturing server requests the web content from the web server 122. Upon receiving the requested web content, the other capturing server forwards the web content to the capturing server 102.

For a third embodiment, by establishing and using an alternate link to the link 130, the capturing server 102 routes a request for geo-restricted web content being hosted by the web server 122 through a proxy server. In one instance, the capturing server 102 routes the request through a smart DNS proxy server. In another instance, the capturing server 102 uses another type of proxy server and/or a proxy tool to make an IP address substitution to gain access to geo-restricted web content.

In a second example, a server for an ISP is an intermediary device on the link 130 between the capturing server 102 and the web server 122. The web server 122 is configured so that web content hosted by the web server 122 is inaccessible to the ISP server, also making the web content inaccessible to the capturing server 102. The capturing server 102 can gain access to the web content in two ways.

For a first embodiment, the capturing server 102 uses multiple ISPs. The capturing server 102 might use multiple ISPs so that service to the user 132, and also other subscribers, is not interrupted when service from a first ISP of the multiple ISPs is temporarily interrupted. While the first ISP is down, the capturing server 102 switches to a second ISP of the multiple ISPs to keep providing service to the user 132. If, while the first ISP is up, the capturing server 102 cannot gain access to web content hosted by the web server 122, the capturing server 102 establishes another link to the web server 122 that is routed through a server for the second ISP in an attempt to gain access to the web content.

For a second embodiment, the capturing server 102 transfers the web browsing session the client device 120 is remotely controlling to another capturing server that is using an ISP different from the ISP being used by the capturing server 102. The other capturing server might be actively linked to the non-volatile storage 116 so that web content captured for the client device 120 continues to be stored at a single location. Alternatively, the other capturing server might capture web content to another non-volatile storage device. In one case, captured web content is synched between the two non-volatile storage devices over a network connection communicatively coupling the two non-volatile storage devices.

Figure 3:
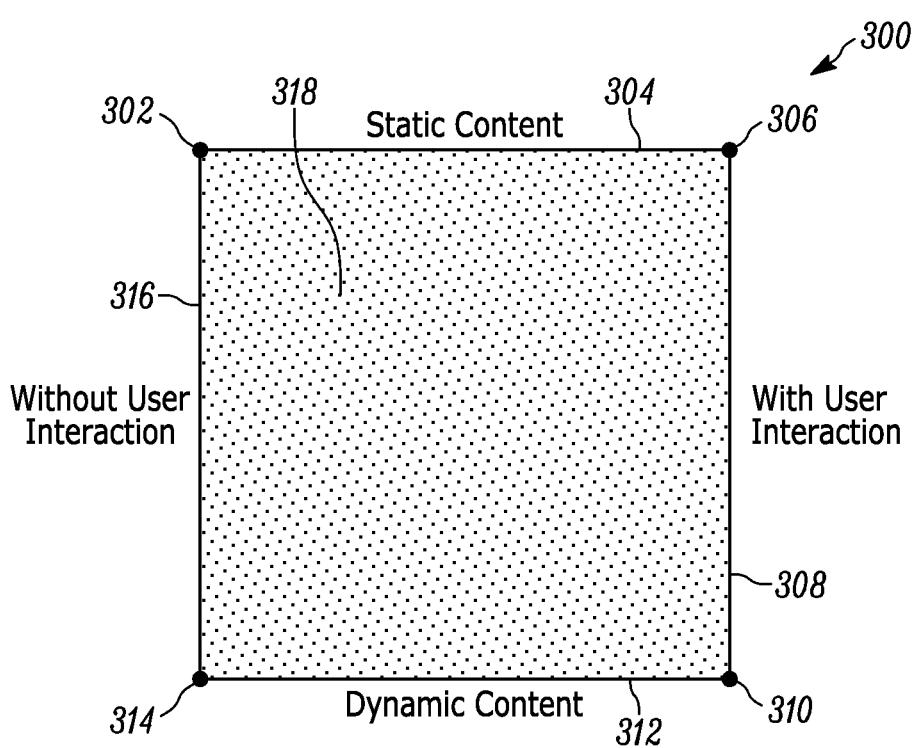
FIG. 3 shows a schematic diagram illustrating the capture of different types of web content, in accordance with some embodiments.

FIG. 3 shows a schematic diagram of a square 300 illustrating different ways of capturing selected web content. Under different use cases, different types of web content are selected for capture. These types of web content and the way in which they are captured are represented by the square 300, which has four edges 304, 308, 312, 316 and four vertices 302, 306, 310, 314. The upper 304 and lower 312 edges of the square 300 represent the capture of static and dynamic web content, respectively. The right edge 308 of the square 300 represents capturing user interactions with selected web content, and the left edge of the square represents the omission of user interactions from captured web content.

The upper-left vertex 302 of the square 300, where the edges 304 and 316 converge, represents the capture of static web content without user interaction. Static web content is web content that remains visually fixed during a time interval over which the web content is captured. Capturing the image of a painting being displayed by a web browser exemplifies the capture of static web content. Because the painting does not change, a single screenshot of the painting is sufficient to capture it.

In some instances, however, due to an amount of static web content being captured, multiple screenshots may be needed to capture the static web content in its entirety. If a webpage is too long and/or too wide to be completely displayed by a web browser without scrolling, then multiple screenshots of the web browser are used to capture the webpage. For a first embodiment, the capturing server 102 captures a long webpage using successive screenshots as it scrolls the webpage from top to bottom a screen at a time. For a second embodiment, the capturing server 102 captures a wide webpage using successive screenshots as it scrolls the webpage from left to right a screen at a time. For a third embodiment, the capturing server 102 captures a webpage that is both too long and too wide to be captured in a single screenshot. The capturing server 102 captures the webpage by taking multiple screenshots as it scrolls the webpage in either the vertical or the horizontal directions a screen at a time so a resulting set of screenshots captures the webpage in its entirety.

In another instance, the area covered by a screenshot selected to be of a particular size is smaller than a viewable area of web content being displayed. While the web content could be captured with a single screenshot, multiple screenshots are used instead to capture the web content. Screenshots of a particular size are also referred to herein as "tiles."

For one embodiment, the capturing server 102 capturing web content includes the capturing server 102 capturing audio content where the web content selected for capture includes audio content. A web browser, for example, uses a browser plug-in to play French music as it displays an image of the Eiffel Tower. A portion of the web content, namely the image, is captured using an image file. The audio portion of the web content is captured using an audio file, such as an MPEG MP3, Waveform Audio File Format (WAV), Vorbis, Advanced Audio Coding (ACC) or Free Lossless Audio Codec (FLAC) file, for instance. A capturing server captures selected web content as set of images when a portion of the web content is stored to non-volatile storage using one or more image files. A remaining portion of the selected web content may be stored using any other type or types of files. For another embodiment, the capturing server 102 capturing web content includes the capturing server 102 capturing other media where other media is represented by or imbedded in web content selected for capture.

The upper-right vertex 306 of the square 300, where the edges 304 and 308 converge, represents the capture of static web content with user interaction. For some embodiments, capturing web content selected for capture includes capturing the client device 120 interacting with the web content. In such cases, the capturing server 102 captures the web content as a set of images by capturing the web content as a video. The actions performed in the web browser executing on the capturing server 102 are controlled remotely by the client device 120 during a web browsing session. For some embodiments, the capturing server 102 captures these remotely controlled actions in addition to the web content being hosted by the web server 122. For a particular embodiment, the remotely controlled actions the capturing server 102 captures includes at least one of: a selection performed during the web browsing session, a swipe performed during the web browsing session, or a rollover performed during the web browsing session. As the user 132 of the client device 120 moves a mouse, for example, the RCP allows for a cursor to move within the web browser executing on the capturing server 102. The cursor can swipe or move from one portion of a webpage displayed by the web browser to another. The cursor can make a selection as the user 132 uses the RCP to click the mouse when the cursor is aligned with a virtual button in the webpage. Combining these two actions, the user 132 can click on a scroll bar of the webpage and drag it to a different position. The user 132 can also perform a rollover by rolling or moving the cursor over an image or a portion of the webpage to display additional information on the image or to solicit another response from the webpage.

In an embodiment, these remotely controlled actions are captured with the web content that makes up the webpage hosted by the web server 122. The capturing server 102 captures both the information being sent to and received from the web server 122 to capture the web browsing session in its entirety. The captured content can be viewed later by playing it as a video, for example, as an MKV or an MPEG MP4 video. Shown in the video are the webpage, the user's interactions with the webpage, and the results of the interactions. For example, the video might show the user scrolling to the bottom of the webpage, clicking on a link to an image, and the resulting image being displayed. A video might also serve as evidence and be played during a trial to demonstrate to a technically unsophisticated jury how a website was coded to respond to particular inputs.

The lower-left vertex 314 of the square 300, where the edges 312 and 316 converge, represents the capture of dynamic web content without user interaction. Dynamic web content is web content having a visual portion that changes in time without user interaction. A movie or an animated sequence of frames playing on a webpage are examples of dynamic web content. Without user input received at the capturing server 102 through the client device 120 during a web browsing session, the movie or animated sequence will continue to play to its conclusion. When dynamic web content is selected for capture, the capturing server 102 captures the dynamic web content as a set of images by capturing the dynamic web content as a video.

For a particular embodiment, dynamic web content, such as a video playing on a web browser, plays with a given frame rate. When the video is captured using a video file, the video is captured using this same frame rate. If, for example, a selected video plays on a webpage at 30 frames per second, then the video is captured at 30 frames per second. This allows an authorized user with access to the captured video to later view each frame of the video as it was presented on the webpage on a frame-by-frame basis. In other embodiments, the user 132 can select a custom frame rate for capturing dynamic web content, even if the selected frame rate does not match the original frame rate of the dynamic web content as presented on the webpage.

The lower-right vertex 310 of the square 300, where the edges 312 and 308 converge, represents the capture of dynamic web content with user interaction. Here, the user 132 elects to capture dynamic web content inclusive of his interaction with the dynamic web content. In some instances, user interaction guides or even generates the dynamic web content. The user 132 plays an online video game, for example, and controls the actions of an avatar within the game. Each interaction the user 132 makes controls how the game develops moving forward. As another example, the user 132 interacts with one portion of a webpage while a video advertisement plays within a window located at another portion of the webpage.

In some instances, web content selected for capture does not fall solely within any specific category described with respect to the four vertices 302, 306, 310, 314 of the square 300. Instead, the web content is a hybridization of the described categories or includes content not described. Such web content can also be captured by the capturing server 102 and is represented by the shaded area 318 within the square 300. As an example, the capturing server 102 can capture dynamic web content in the same way it captures static web content, namely as a set of one or more images of the web content taken at a single time. A webpage, for instance, has an embedded window in which a movie trailer is playing. As the capturing server 102 captures the webpage, only a single frame of the movie trailer is captured. The captured frame of the movie trailer is the frame that was loaded into the web browser executing on the capturing server 102 at the moment the capture was made.

To select web content for scheduled capture, a web browsing session between the capturing server 102 and the web server 122 can be initiated in a number of ways. In a first type of embodiment, the web browsing session between the capturing server 102 and the web server 122 is established by transferring a web browsing session between the client device 120 and the web server 122 to the capturing server 102. For example, the web browsing session between the client device 120 and the web server 122 is transferred to the capturing server 102 by initiating a capture mode at the client device 120. Initiating a capture mode means to prepare, initialize, or make the capturing system 100 ready to select web content hosted by web servers for scheduled capture. Alternatively, in a second type of embodiment, the client device 120 does not transfer, but rather initiates the web browsing session between the capturing server 102 and the web server 122 to initiate a capture mode and begin selecting web content for scheduled capture.

In an embodiment of the first type, the user 132 of the client device 120 clicks a representation of a button provided by a browser extension and displayed in a web browser executing on the client device 120 to transfer the web browsing session from the client device 120 to the capturing server 102. In doing so, the client device 120 establishes the link 128. The capturing server 102, in turn, establishes the link 130 to the web server 122 the client device 120 was browsing.

In transferring the web browsing session for a particular embodiment, the client device 120 sends the capturing server 102 the URL of the web server 122. In further embodiments, the client device 120 sends data in addition to the URL to allow the capturing server 102 to more closely replicate the web browsing session being transferred. If the user 132 is logged into an account on the web server 122, such as a bank account or a social networking account, for example, then the client device 120 sends the capturing server 102 additional information, including credentials the client device 120 has accumulated during its web browsing session with the web server 122. In this way, the session is transferred to the capturing server 102 without being interrupted.

In some instances, the web server 122 is spoofed into thinking it is still participating in a web browsing session with the client device 120. In other instances, however, as when the web server 122 uses ingress and/or egress filtering, the web server 122 recognizes that packets are no longer being received from and/or being sent to the same address (i.e., the address of the client device 120). The user 132 then repeats the login procedure for his account from within the transferred web browsing session between the capturing server 102 and the web server 122.

For a number of embodiments, session cookies maintained by a web browser executing on the client device 120 during a web browsing session are transferred to the capturing server 102 with the web browsing session. For the resulting web browsing session established between the capturing server 102 and the web server 122, a web browser now executing on the capturing server 102 is in possession of the session cookies which were being previously maintained by the web browser executing on the client device 120.

Clicking the button provided by the browser extension also launches the RCP on the client device 120, allowing the client device 120 to direct a web browser executing on the capturing server 102 to specific web content hosted by the web server 122. While the client device 120 is running the RCP, the user 132 sees displayed on a screen of the client device 120 a representation of the web browser executing on the capturing server 102 within a graphical interface executing on the client device 120.

In an embodiment of the second type, regardless of web browsing sessions, if any, that are active at the client device 120, the user 132 double clicks an icon displayed on a desktop of an operating system running on the client device 120 to initiate the capture mode. The client device 120 launches a default RCP application or displays a prompt to select one, if one is not already executing, establishes the link 128, and launches the RCP application. When connecting with the capturing server 102, the user 132 receives a login prompt from the capturing server 102 to verify the user 132 is a subscriber. The capturing server 102 establishes the link 130 and a web browsing session, supported by the link 130, with the web server 122 as the user 132 uses the RCP to direct the capturing server 102 to web content hosted by the web server 122.

In another embodiment, a web browser is executing on the client device 120, or the user 132 launches one. The user 132 enters an IP address or a domain name into the browser to navigate to the capturing server 102 and initiate the capture mode. After logging into the capturing server 102, the user 132 can use the client device 120 to direct the capturing server 102 to web content hosted by the web server 122 or web content hosted by other web servers. As the client device 120 directs the capturing server 102 to a web server, the capturing server 102 establishes a link with that web server to support a web browsing session between the capturing server 102 and the web server.

Figure 4:
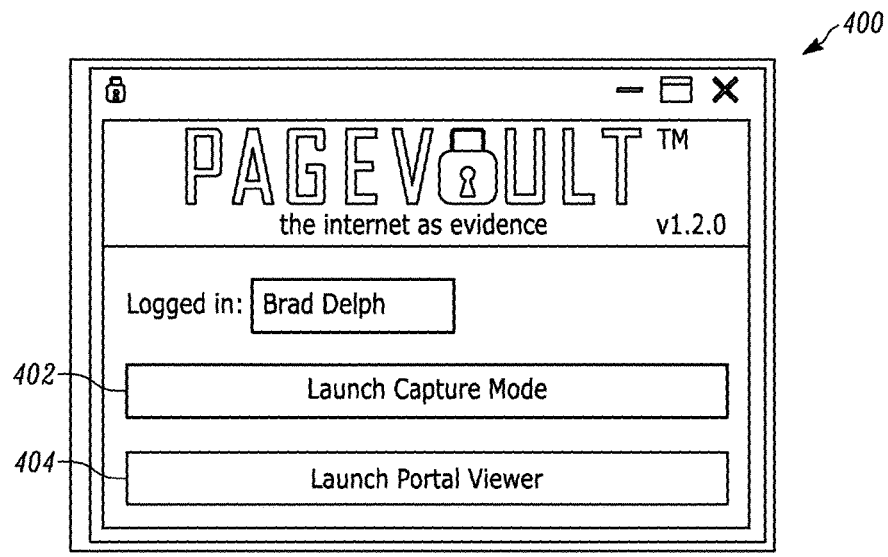
FIG. 4 shows an interactive graphic presented by a client device for initiating a scheduled capture session, in accordance with some embodiments.

FIG. 4 shows an example of an interactive graphic 400 presented by the client device 120 for initiating a capturing session. For an embodiment, the user 132 is presented with the graphic 400 after double clicking a desktop icon to establish a connection with the capturing server 102. The interactive graphic 400 includes buttons 402 and 404. The user 132 clicks the button 402 to launch a capture mode and transition into a capturing session as described above. Alternatively, the user 132 clicks the button 404 to view, manage, or otherwise access captures made previously with the capturing system 100. Upon entering the correct credentials for authorization purposes, the user 132 logs into the capturing server 102 or another electronic computing device that provides the user 132 with access to previously captured web content stored using the non-volatile storage 116.

Figure 5:
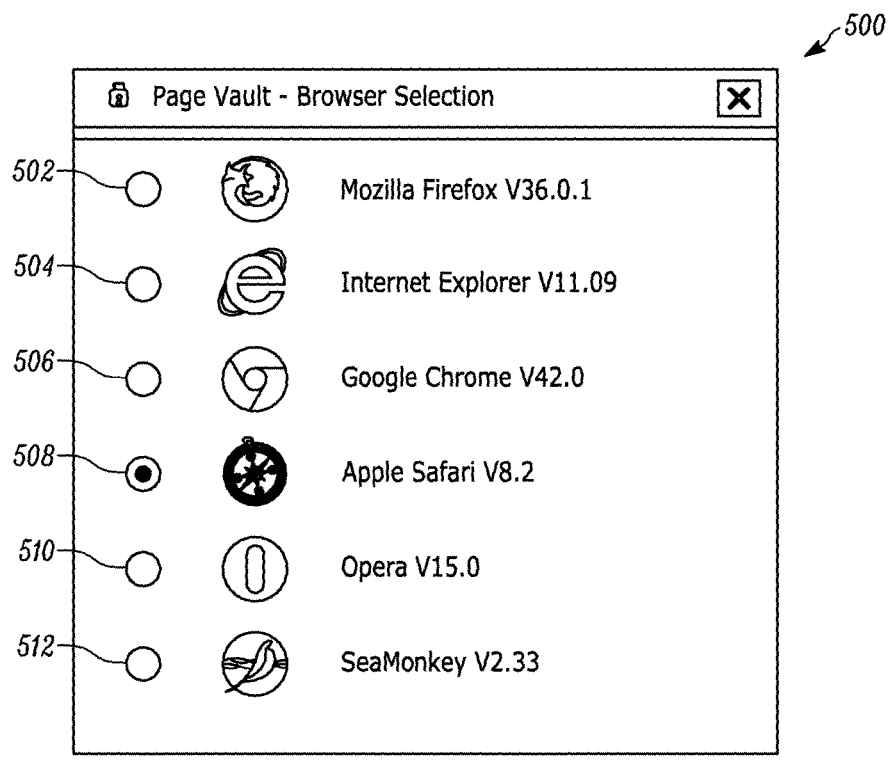
FIG. 5 shows an interactive graphic presented by a client device for selecting a web browser to capture web content, in accordance with some embodiments.

For some embodiments, the client device 120 presents the user 132 with an option to select a web browser to execute on the capturing server 102 when the user 132 launches the capture mode. FIG. 5 shows an interactive graphic 500 offering six web browsers from which to choose. By clicking one of six radio buttons 502, 504, 506, 508, 510, 512, the user 132 selects the web browser paired with the clicked button. The capturing server 102 receives an indication of the web browser selected over the link 128 and responsively launches the selected web browser.

For instance, by clicking the radio button 508, as shown, the user 132 selects the Apple Safari web browser for use by the capturing server 102 in browsing web content and again for capturing selected web content. For the third web browsing mechanism, this choice is independent of any web browser executing on the client device 120. The client device 120 can be executing the Mozilla Firefox web browser, for example, to browse a content server executing on the capturing server 102 as the capturing server 102 is executing the Apple Safari web browser to browse the web server 122. When the capturing server 102 captures selected web content in accordance with schedule information as one or more images, the web content is captured as it appears loaded into the Apple Safari web browser, or any other web browser the user chooses to execute on the capturing server 102.

Web content hosted by the web server 122 can include data that allows for a plurality of presentation formats. These presentation formats are associated with different web browsers and/or operating systems that the capturing server 102 might use. Some webpages are designed to display web content differently depending upon a device and/or browser used to display the content. Other webpages, independent of their design, appear differently as a consequence of a device, an operating system, and/or a web browser used to display them. For example, different cascading style sheets (CSSs) might be used for different web browsers, or CSS code might be hidden from older web browsers. Also, different web browsers follow different sets of standards, often causing the same webpage to appear differently in each web browser, even if the web content for the webpage is non-browser specific.

Because the capturing server 102 captures web content as screenshots of the web browser the capturing server 102 is executing, the captures are, at least in part, visual representations of the web content loaded in the web browser. Allowing for the selection of a specific web browser to execute on the capturing server 102 allows the user 132 a degree of control over how selected web content is captured.

Figure 6:
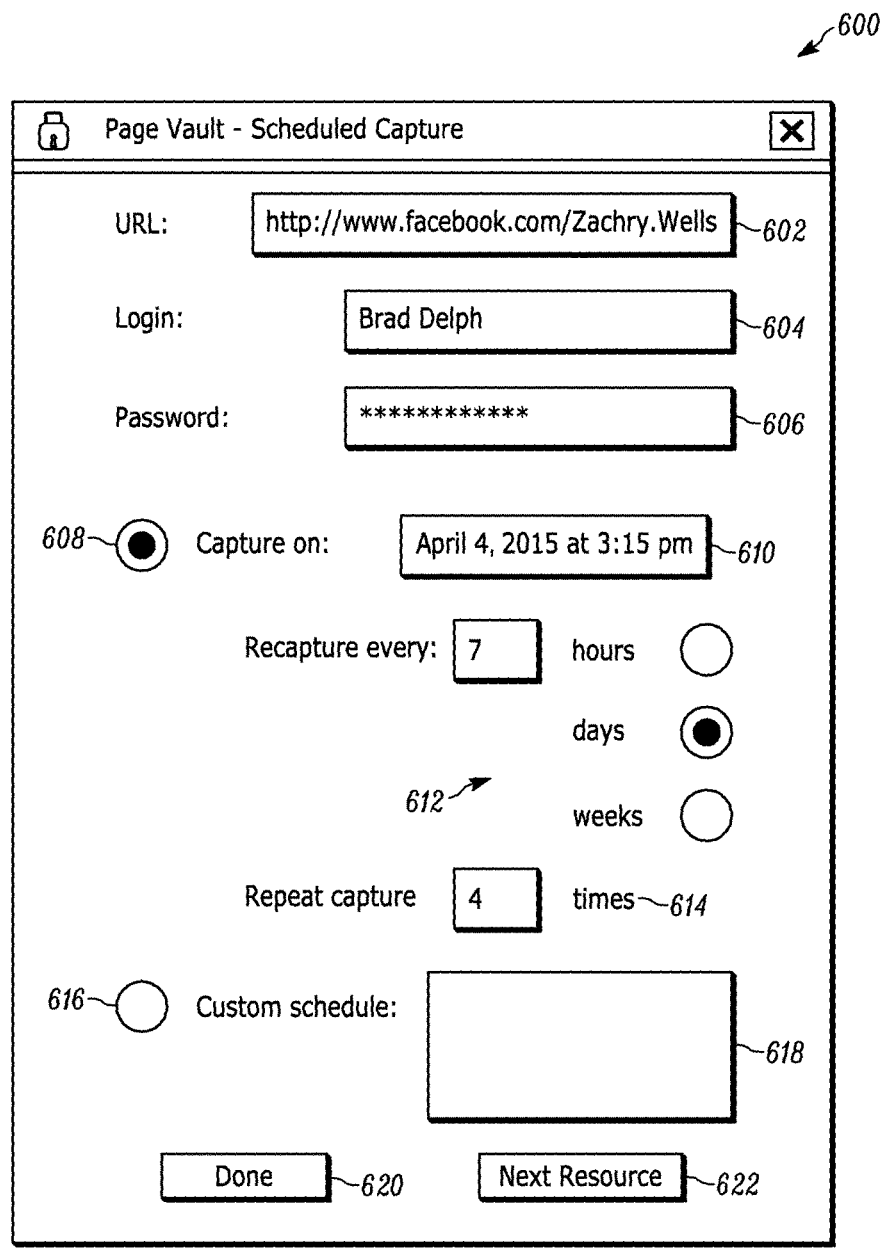
FIG. 6 shows an interactive graphic presented by a client device for scheduling captures, in accordance with some embodiments.

FIG. 6 shows an interactive graphic presented by the client device 120 for scheduling the capture of web content. The interactive graphic represents a scheduling dialogue box 600 that the client device 120 presents to the user 132 when the client device 120 receives an indication that the user 132 wishes to schedule the capture of a web resource. The user 132, for example, selects a Facebook webpage belonging to Zachry Wells for scheduled capture. The user 132 would like to repeatedly capture Zachry Wells' Facebook webpage for a month and indicates this by populating the scheduling dialogue box 600.

In a text input window 602, the user 132 enters the URL for which he is scheduling captures, in this case "http://www.facebook.com/Zachry.Wells." In text input windows 604 and 606, the 132 user can enter credentials used by the capturing server 102 in accessing deep web content at the time of capture. In the immediate case, the user 132 enters the name "Brad Delph" in the text input window 604 and a Facebook password for Brad Delph in the text input window 606. Brad Delph, for example, is listed as a friend on Zachry Wells' Facebook account. Therefore, scheduled captures will show Zachry Wells' Facebook webpage as it would appear to Brad Delph logged into his Facebook account at the time of capture. If credentials are not required to access the URL specified in the text input window 602, then the input text windows 604 and 606 are left blank.

The user 132 clicks on a radio button 608 to schedule periodic captures and enters a time and date into a text input window 610. In the immediate case, the entered date of April 4 is the first date on which the capturing server 102 captures the indicated Facebook webpage. In an interval section 612 of the scheduling dialogue box 600, the user 132 indicates the capture is to be repeated every seven days. To set a month of weekly captures, the user 132 specifies in a text input window 614 that the capture is to be repeated four times.

To schedule non-periodic captures, the user 132 clicks on a radio button 616, which automatically deselects the radio button 608. This allows the user 132 to enter a custom schedule into a text input window 618. For example, the user 132 enters "Apr. 4, 2015 at 3:15 pm; Apr. 5, 2015 at 9:00 am; Apr. 28, 2015 at 12:00 pm; May 15, 2015 at 12:00 pm" to make captures at irregular intervals.

For some embodiments, at the time of capture, the capturing server 102 compares the web content scheduled for capture against a previous capture of the web content. For example, the capturing server 102 determines that the web content has not changed since the last capture. Accordingly, the capturing server 102 indicates, as metadata, that the web content remains the same and does not again capture the unchanged web content. For another embodiment, the capturing server 102 determines that the web content has changed since the last capture. Accordingly, the capturing server 102 captures only that portion of the web content that has changed.

To finish scheduling the capture of Zachry Wells' Facebook webpage, the user 132 clicks a "done" virtual button 620 to confirm the entered schedule information and to close the scheduling dialogue box 600. After the scheduling dialogue box 600 is closed, the client device 120 communicates the schedule information entered into the scheduling dialogue box 600 to the capturing server 102 over the link 128.

If the user 132 has indicated additional web resources to the client device 120 for scheduled capture, the user may click a "next resource" virtual button 622 in place of the virtual button 620. When the user 132 clicks the virtual button 622, the schedule information for capturing Zachry Wells' Facebook webpage is submitted to the client device 120. The client device 120 then clears the text input windows and radio buttons of the scheduling dialogue box 600, and populates the text input window 602 with a next resource the user 132 has indicated for scheduled capture. The user 132 populates the scheduling dialogue box 600 with schedule information for the next resource and thereafter clicks either the "done" virtual button 620 or the "next resource" virtual button 622.

If the user 132 has not indicated additional web resources to the client device 120 for scheduled capture, he can do so by clicking the "next resource" virtual button 622. The schedule information for capturing Zachry Wells' Facebook webpage is submitted to the client device 120, and the client device 120 clears the text input windows and radio buttons of the scheduling dialogue box 600 to allow the user 132 to indicate the next resource. The user 132 enters the URL for the next resource he wishes to capture in the text input window 602 and then fills in the schedule information for the resource.

For some embodiments, the capturing server 102 is configured to batch capture multiple web resources which are scheduled to be captured together at a common time or which are to be captured together at a present time. For one embodiment, a set of indications the capturing server 102 receives from the client device 120 includes indications for web content to batch capture. The capturing server 102 batch captures the web content as multiple sets of images. In a further embodiment, the capturing server 102 captures each web resource indicated for batch capture as a different set of images. Batch capturing multiple resources is described in greater detail with respect to FIG. 7.

Figure 7:
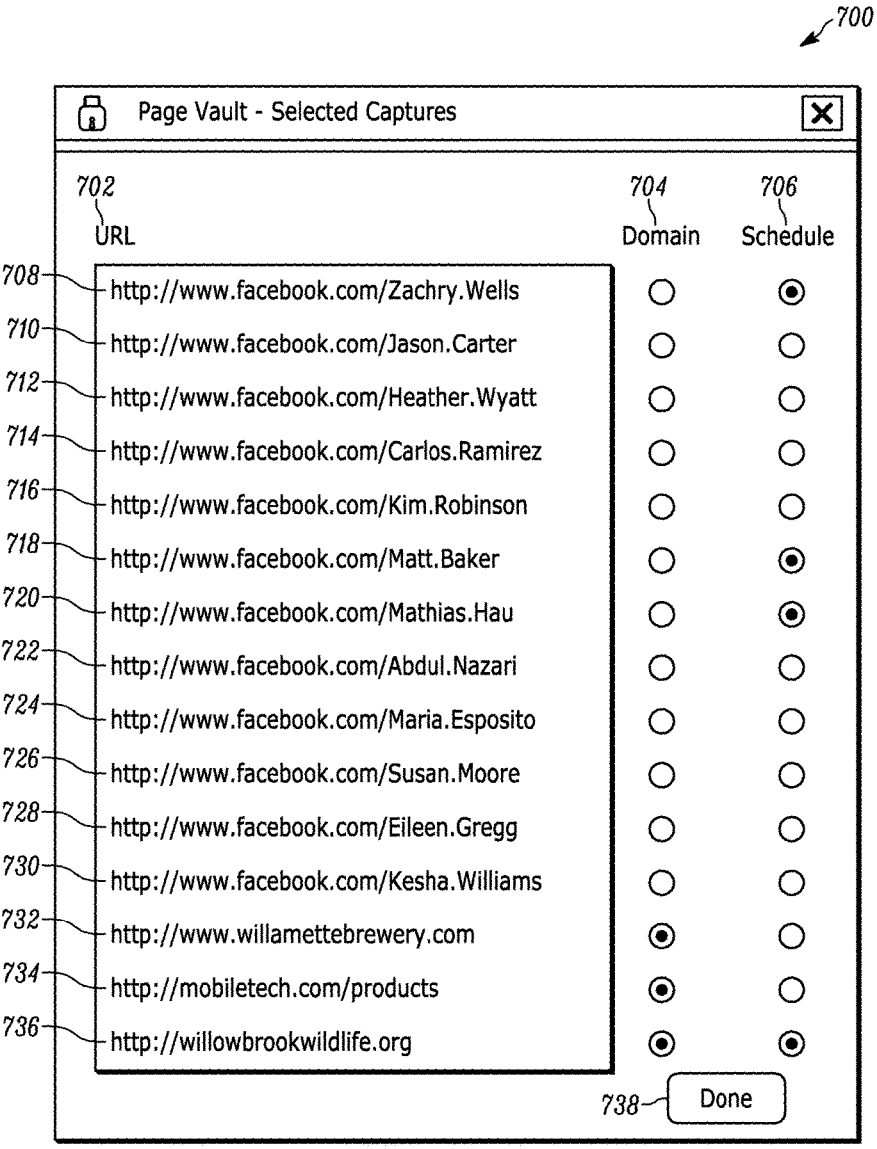
FIG. 7 shows an interactive graphic presented by a client device for managing web content selected for capture, in accordance with some embodiments.

FIG. 7 shows an interactive graphic 700 having three columns 702, 704, 706 and fifteen rows 708, 710, 712, 714, 716, 718, 720, 722, 724, 726, 728, 730, 732, 734, 736, which is presented by the client device 120 for managing web content selected for capture. Listed in the first column 702 are fifteen URLs the user 132 has "tagged" for capture. As the user 132 is using the client device 120 to remotely control a web browser executing on the capturing server 102, for example, the user 132 navigates the web browser to the Facebook webpage of Zachary Wells, which is being hosted by the web server 122. The user 132 clicks a virtual "capture" button appearing in an interface for the RCP he is using, which indicates to the client device 120 the current webpage is to be captured. Responsively, the client device 120 adds the URL "http://www.facebook.com/Zachry.Wells" in the first column 702 of the interactive graphic 700 at row 708 when the interactive graphic 700 is presented.

As the user 132 continues to browse, he tags additional webpages he wishes to capture. The client device 120 tracks each tagged webpage as a separate web resource. After navigating to and tagging for capture the Facebook webpages of Jason Carter, Heather Wyatt, Carlos Ramirez, Kim Robinson, Matt Baker, Mathias Hau, Abdul Nazari, Maria Esposito, Susan Moore, Eileen Gregg, and Kesha Williams, the user 132 navigates to and tags for capture the top-level webpage of a website belonging to Willamette Brewery, which is being hosted by a second web server, different from the web server 122. The user 132 also navigates to and tags for capture the top-level webpage for Willowbrook Wildlife Haven and the products webpage for Mobile Technology Corporation, being hosted by a third and fourth web server, respectively.

As an alternative to remotely controlling a web browser executing on the capturing server 102 to tag web resources to capture, the user 132 can specify the fifteen URLs listed in the interactive graphic 700 by individually entering each URL into the client device 120 using an input component of the client device 120. For one embodiment, the input component is a keyboard. In another embodiment, the input component is a microphone coupled with voice processing hardware and/or software configured for speech recognition.

In some instances, the set of indications the user 132 specifies includes an indication to capture a web resource which includes embedded links to other web resources not specified by the user 132 for capture. For particular embodiments, the capturing server 102 receiving the set of indications also captures some or all of the embedded resources not specified by the user 132, in accordance with a set of criteria. For instance, the user 132 specifies the Facebook webpage of Zachary Wells for capture but does not specify any additional Facebook webpages for capture. The capturing server 102, however, also captures the Facebook webpages referenced in the Hypertext Markup Language (HTML) source code for Zachry Wells' Facebook webpage.

In a first example, the client device 120 populates the interactive graphic 700 with the specified URL for Zachry Wells' Facebook webpage. The client device 120 also populates the interactive graphic 700 with the unspecified URLs for the Facebook webpages embedded in Zachry Wells' Facebook webpage. Specifically, the Facebook webpages for Jason Carter, Heather Wyatt, Carlos Ramirez, Kim Robinson, Matt Baker, Mathias Hau, Abdul Nazari, Maria Esposito, Susan Moore, Eileen Gregg, and Kesha Williams also populate the interactive graphic 700.

In a second example, the client device 120 populates the interactive graphic 700 with the specified URL for Zachry Wells' Facebook webpage but does not populate the interactive graphic 700 with any of the embedded Facebook webpages. In this case, the capturing server 102 captures the webpages embedded in Zachry Wells' Facebook webpage in accordance with schedule information provided for Zachry Wells' Facebook webpage.

After the user 132 finishes tagging or otherwise specifying web resources for capture, the client device 120 presents the interactive graphic 700 with the fifteen URLs the user specified listed in the first column 702. For one embodiment, the user 132 calls up the interactive graphic 700 to manage specified web content by clicking a virtual button displayed by the client device 120. In another embodiment, the client device 120 presents the user 132 with the interactive graphic 700 automatically. For example, when the user 132 ends the web browsing session used to tag web content by closing the web browser executing on the capturing server 102, or when the user 132 finishes specifying URLs by closing a dialog box.

The second column 704 of the interactive graphic 700 presents a domain radio button for each specified URL listed in the first column 702. By leaving the domain radio button unchecked for a listed URL, the capturing server 102 captures only a single webpage for the listed URL. The capturing server 102 captures the webpage "http://www.facebook.com/Zachry.Wells," for example, but does not capture the webpage "http://www.facebook.com/Zachry.Wells/friends" or any other lower-level webpages belonging to the same website.

For a particular embodiment, a set of indications the capturing server 102 receives from the web server 120 includes an indication for a website, which is identifiable by a domain name. In response to receiving the set of indications, the capturing server 102 captures multiple webpages of the website having the domain name.

To additionally capture Zachry Wells' "friends" webpage, for example, the user can navigate to it and tag it for capture or input its URL. This results in the webpage "http://www.facebook.com/Zachry.Wells" and the webpage "http://www.facebook.com/Zachry.Wells/friends" each being listed in the first column 702 of the interactive graphic 700 as separate resources to capture.

Alternatively, to capture the webpage "http://www.facebook.com/Zachry.Wells/friends," the user 132 can check the domain radio button in the first row 708. This results in the capturing server 102 capturing not only the tagged webpage "http://www.facebook.com/Zachry.Wells," but also all lower-level webpages belonging to the same website. This would include both the webpage "http://www.facebook.com/Zachry.Wells/friends" and the webpage "http://www.facebook.com/Zachry.Wells/photos," for example.

In the thirteenth row 732, the domain radio button is checked for the specified webpage "http://www.willamettebrewery.com." Because the specified webpage is the top-level webpage for the Willamette Brewery website, every page of the website is captured. The same is true for the Willowbrook Wildlife Haven website, as shown in the fifteenth row 736. For the fourteenth row 734, the top-level products webpage is specified for the Mobile Technology website. Therefore, with the domain radio button checked, the capturing server 102 captures all the products webpages for the website. Depending on the architecture of the website, this might be the single webpage "http://mobiletech.com/products," or include additional webpages, such as "http://mobiletech.com/products/cell_phones" and "http://mobiletech.com/products/2-way_radios," for example.

The third column 706 of the interactive graphic 700 presents a schedule radio button for each specified URL listed in the first column 702. By checking the schedule radio button for a listed URL, the user 132 indicates the web resource associated with the URL is to be captured in accordance with schedule information. The client device 120 receives the schedule information for the web resource from the user 132 and sends the schedule information to the capturing server 102 either with or separately from an indication to capture the web resource.

For one embodiment, the client device 120 presents the user 132 with the scheduling dialogue box 600 each time the user 132 checks a schedule radio button for a specified web resource in the interactive graphic 700. For example, the user 132 checks the schedule radio button in the first row 708 for Zachry Wells' Facebook webpage. Responsively, the client device 120 presents the user with the scheduling dialogue box 600 for which the text input window 602 is already populated with the URL appearing in the first row 708 of the interactive graphic 700. When the user 132 finishes entering schedule information for Zachry Wells' Facebook webpage into the scheduling dialogue box 600, the user clicks the "done" virtual button 620 and is returned to the interactive graphic 700.

For another embodiment, the client device 120 presents the user 132 with the scheduling dialogue box 600 when the user 132 closes the interactive graphic 700, provided the user 132 has indicted in the interactive graphic 700 at least one web resource to schedule. For example, the user 132 checks the schedule radio buttons in rows 708, 718, 720, and 736, as shown. The user then clicks a "done" virtual button 738 and is presented with the scheduling dialogue box 600. The text input window 602 of the scheduling dialogue box 600 is already populated with the URL appearing in the first row 708 of the interactive graphic 700, which is the first URL for which the user 132 checked the schedule radio button. When the user 132 finishes inputting schedule information for Zachary Wells' Facebook webpage, he clicks the "next resource" virtual button 622. The client device 120 accepts the schedule information for Zachary Wells' Facebook webpage, clears the text input fields of the scheduling dialogue box 600, and populates the text input field 602 with the URL of Matt Baker's Facebook webpage, the next URL for which the user 132 checked the schedule radio button appearing in the row 718 of the interactive graphic 700. As the user 132 submits schedule information for each web resource checked for scheduled capture, the client device 120 prompts for schedule information for the next web resource checked for scheduled capture.

Rows 710, 712, 714, 716, 722, 724, 726, 728, 730, 732, and 734 of the interactive graphic 700 indicate eleven web resources specified by the user 132 for capture for which the schedule radio button is not checked. For a group of embodiments, these eleven web resources are batch captured together, or within a short time interval of one another, on a current calendar date. For example, it might take ten minutes for the capturing server 102 to capture the eleven web resources if they are captured in succession one at a time. It might take a shorter amount of time, given sufficient network bandwidth, if the capturing server 102 is configured to establish multiple simultaneous links with different web servers to capture at least some web resources contemporaneously.

In another embodiment for which the capturing server 102 has a plurality of specified web resources to capture, the capturing server 102 can direct a second capturing server to capture a portion of the specified web resources. This allows for load balancing between two capturing servers to make more efficient use of capturing resources. The capturing server 102 sends indications for the portion of the web resources the second capturing server is to capture. The capturing server 102 can also send additional information, such as configuration information in the form of cookies, to help facilitate the captures. In further embodiments, load balancing in this way occurs between three or more capturing servers. For a particular embodiment, each capturing server captures specified web resources to the non-volatile storage 116 to which each capturing server is communicatively coupled via a network connection.

The user 132 can be, but need not be, logged into the capturing server 102 for batch captures. This frees up the user 132 to perform other tasks while the capturing server 102 batch captures specified web resources. For example, the user 132 establishes a capturing session by logging into the capturing server 102 as a subscriber. The user 132 then remotely navigates a web browser executing on the capturing server 102 to different web servers and tags different web resources to capture. When the user 132 indicates to the client device 120 he has finished browsing and tagging web resources for capture, by clicking a virtual button, for instance, the client device 120 presents the user 132 with the interactive graphic 700. The interactive graphic 700 allows the user 132 to flag tagged web resources for scheduled capture and to provide schedule information for those web resources. When the user 132 finishes managing the tagged web resources, he clicks on the "done" virtual button 738.

In a first embodiment, after the user closes the interactive graphic 700 but while the user is still logged into the capturing server 102, the capturing server begins batch capturing tagged web resources for which the user did not indicate schedule information. If the user 132 logs out of the capturing server 102 before the capturing server 102 completes batch capturing the tagged web resources, then the capturing server 102 continues capturing until it has completed the batch capture.

In a second embodiment, the capturing server 102 begins batch capturing tagged web resources after the user 132 logs out of the capturing server 102 and after the link 128 is taken down. By delaying the batch capture until after the user 132 logs out, the capturing server 102 conserves processor and/or bandwidth resources for the user 132 while he is still interacting with the capturing server 102 to browse additional web resources, for example.

In a third embodiment, some of the web resources flagged for scheduled capture are batch captured with web resources not flagged for scheduled capture. For example, a flagged web resource is scheduled to be captured multiple times, once at a current time or on a current date, and again on one or more future dates. The capturing server 102 includes the flagged web resource in the batch capture for the current date. The capturing server 102 additionally captures the flagged web resource again on all future dates for which the flagged web resource is scheduled to be captured.

In one embodiment, the capturing server 102 uses the same link 124 to transfer to the non-volatile storage device 116 different sets of images for web resources captured on different dates. For example, the capturing server 102 uses the link 124 to batch capture a set or resources on a current date and again uses the link 124 twelve days later to capture another web resource in accordance with schedule information. In an alternate embodiment, the capturing server 102 establishes different links with the non-volatile storage device 116 for different captures occurring at different times or on different dates. For example, after batch capturing the set of resources on the current date, the link 124 is taken down. Twelve days later, the capturing server 102 establishes another link with the non-volatile storage device 116 to capture the scheduled resource.

For some embodiments, the capturing server 102 captures web content that includes deep web content, such as when the client device 120 directs the web server 122 to a user's bank or social networking account. In other embodiments, the web content the capturing server 102 captures is selected with a URL. For a particular embodiment, the capturing server 102 also captures expandable web content associated with the URL. Expandable web content associated with a URL is web content that is not initially displayed in a web browser upon navigating the web browser to the URL. Rather, the expandable web content is shown upon a user performing an interaction with a webpage associated with the URL.

For a group of embodiments, a web resource selected for capture includes expandable web content which is partially or fully expanded prior to the capturing server 102 capturing the web resource. Some webpages, for example, include expandable web content which can be expanded prior to capturing the webpages. In capturing expandable web content for an embodiment, the capturing server 102 receives an indication of a selected webpage to capture which includes an indication to expand the webpage at the time of capture. After receiving the indication from the client device 120 over the link 128, the capturing server 102 expands expandable portions of the webpage at the time of capture and captures the webpage in its expanded form. In other embodiments, the capturing server 102 expands only a portion of an expandable web resource before capturing the web resource. For one embodiment, the capturing server 102 receives an indication from the client device 120 as to which portion of the expandable web resource to expand prior to capturing the web resource.

Where an "onClick" script command is coded into the HTML for a webpage, for example, the user clicks on a button or object embedded in the webpage to show additional content for the webpage without leaving a URL for the webpage. In an implementation, the capturing server 102 makes a single call (i.e., request) to the web server 122 to get all the web content associated with a URL, inclusive of the expandable web content. The expandable web content for the URL is stored in a cache memory of the capturing server 102 (e.g., the memory 106) until the user 132, using the RCP of the client device 120 during the web browsing session, performs an action that selects the expandable web content, at which time the expandable web content is loaded and visible to the user 132.

Figure 8A:
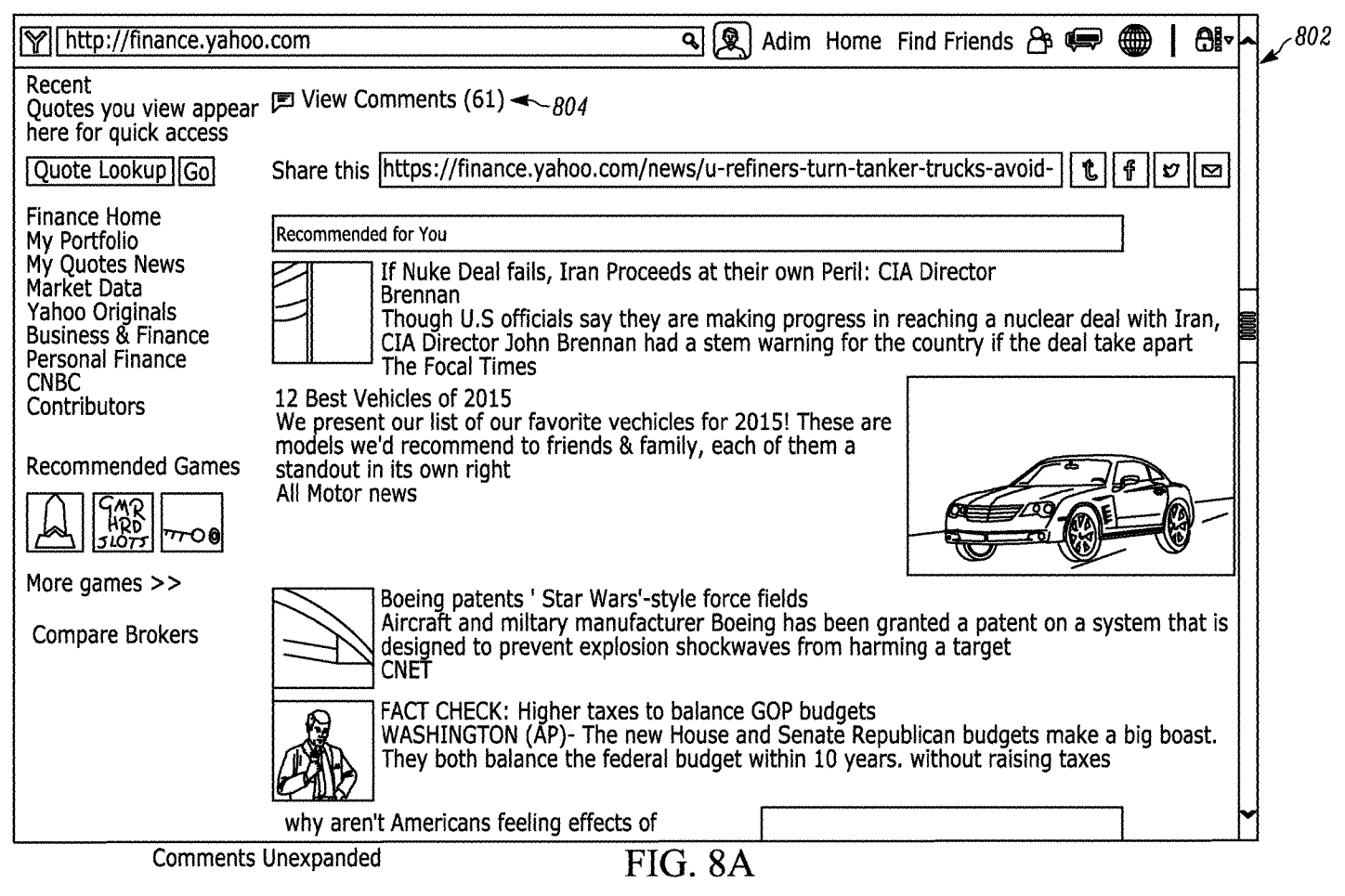

FIGS. 8A and 8B show two screenshots 802, 806 of a webpage for a Yahoo! financial article. For each of the screenshots 802, 806, the webpage has been scrolled to the end of the article, where an expandable comment section 808 begins. In the screenshot 802, posted comments are collapsed, but a hypertext link 804 appears showing the text "View Comments (61)." If the user 132 does not expand the comment section 808 by clicking on the hypertext link 804, then the resulting capture appears as shown by the screenshot 802.

If the user 132 wishes to capture the webpage with the comment section 808 expanded, then the user 132 clicks on the hypertext link 804 using an RCP application executing on the client device 120. This expands the comment section 808 in a web browser executing on the capturing server 102, allowing the user 132 to see how the webpage appears expanded. When the capturing server 102 captures an image of the web browser it is executing, either in real time or for scheduled captures, it captures the webpage, or a portion of the webpage, with the comment section 808 expanded, as shown in the screenshot 806.

For an embodiment, the user 132 tags a webpage for capture after he expands the webpage. For real-time capture, the expanded webpage is captured as it currently appears loaded into a browser executing on the capturing server 102. For scheduled captures, the capturing server 102 expands the webpage before capturing the webpage to same extent the user 132 expanded the webpage before tagging the webpage for scheduled capture.

In one embodiment directed to capturing expanded web content, the capturing server 102 sends to the client device 120, over the link 128, a list of expandable portions of a selected webpage. The client device 120 presents the list to the user 132, whereupon the user 132 selects from the list a set of expandable portions of the webpage to expand. The client device 120 sends an indication of the selected set of expandable portions back over the link 128 where it is received by the capturing server 102. The capturing server 102, at the time of capture, expands the indicated portions of the webpage and proceeds to capture the webpage in either a fully or a partially expanded state. In another embodiment, the user 132 selects a range of a web resource to expand using the client device 120. The capturing server 102, upon receiving an indication of the selection, expands all the expandable web content that falls within the selected range before capturing the web resource.

Figure 9:
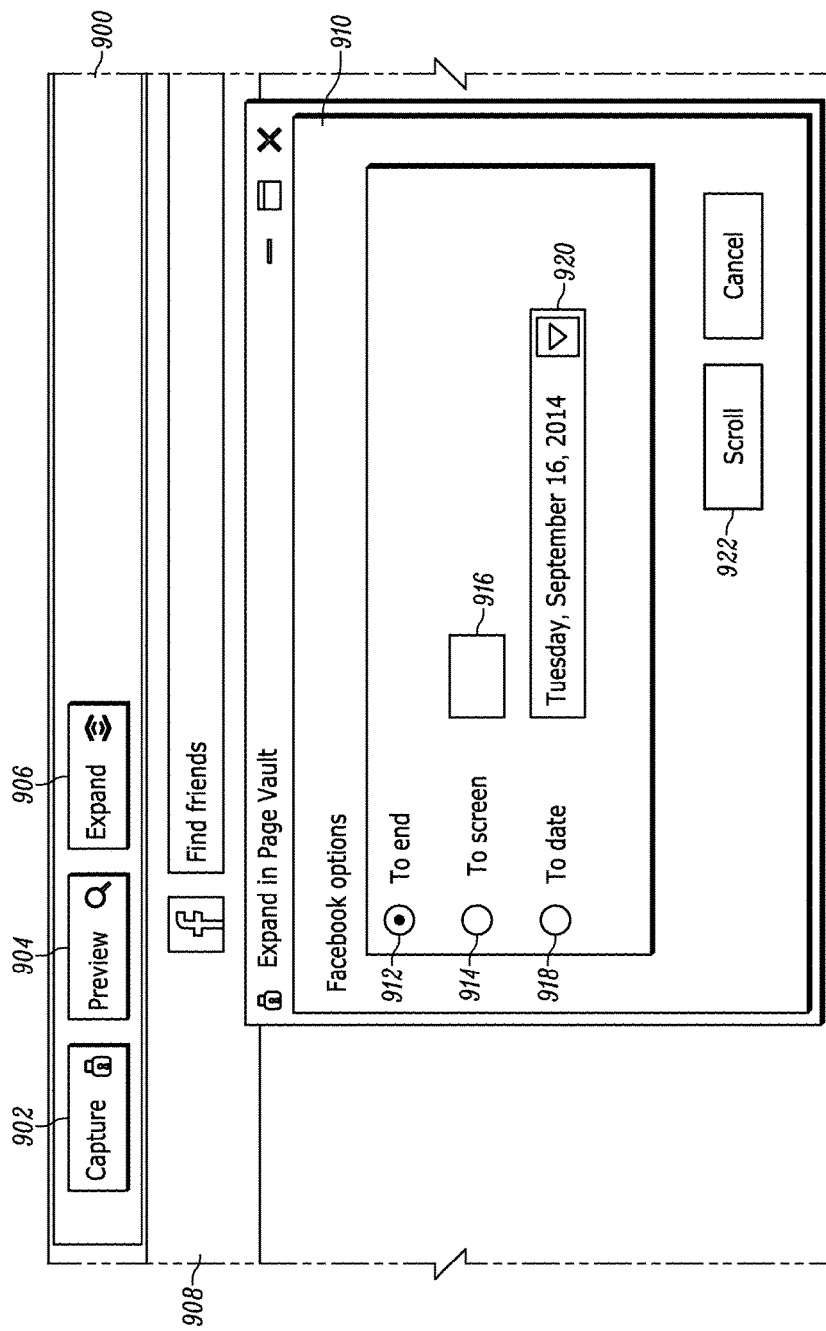
FIG. 9 shows an interactive graphic presented by a client device used to expand web content for capture, in accordance with some embodiments.

FIG. 9 shows an interactive graphic 900 presented by the client device 120 for capturing expanded web content. Using an RCP application executing on the client device 120, the client device 120 displays the interactive graphic 900 along with a webpage the user 132 of the client device 120 is viewing. As shown, the interactive graphic 900 appears as a ribbon above a Facebook webpage 908 being displayed. The interactive graphic 900 also includes three buttons: a capture button 902, a preview button 904, and an expand button 906.

For an example, the user 132 wishes to expand expandable portions of the Facebook webpage 908 he is viewing and clicks on the expand button 906. In response, the client device 120 displays a dialogue box 910. By default, a radio button 912 is selected, as shown. This setting expands all expandable content in the Facebook webpage 908, from the beginning of the webpage 908 through to the end of the webpage 908.

The user 132 can click on a radio button 914 and enter a number in a text input window 916 to expand the Facebook webpage 908 up to a screen that reflects the entered number. If the user 132 enters "3," for example, the first three screens of the Facebook webpage 908 are expanded. If the Facebook webpage 908 is less than three screens long, as determined by a zoom setting and a viewable area of the display, then the entire Facebook webpage 908 is expanded.

The user 132 can also click a radio button 918 and provide a date for a text input window 920. This expands comments, posts, and other entries made to the Facebook webpage 908 on or before, but not after, the provided date.

A scroll button 922 gives the user 132 the option of scrolling down the Facebook webpage 908 and expanding expandable web content up to the location the user 132 stops scrolling. Web content below where the user 132 stops scrolling remains unexpanded.

In further embodiments, the expansion of web content upon clicking one of the radio buttons 912, 914, 918 or the scroll button 922 begins not from the beginning of the Facebook webpage 908 but rather from a location of a cursor on the Facebook webpage 908 when the user 132 begins his selection. For example, the user 132 uses the mouse of the client device 120 to scroll down and click in the middle of a second displayed page of the Facebook webpage 908. This places the cursor in the middle of the second page. The user 132 then clicks the radio button 912 to expand all the expandable web content below the middle of the second page of the Facebook webpage 908.

After using the dialog box 910 to specify how the Facebook webpage 908 is to be expanded upon capture, the user 132 clicks the preview button 904 to show the expansion. If the user 132 is satisfied with how the expansion appears, he clicks the expand button 906. Upon clicking the expand button 806, the client device 120 communicates over the link 128 to the capturing server 102 an indication of how the Facebook webpage 908 is to be expanded when it is captured. Upon receiving the indication, the capturing server 102 expands the Facebook webpage 908 loaded in the web browser executing on the capturing server 102 for capture in accordance with the received indication, for example.

In one embodiment, upon the user 132 activating a particular setting, the capturing server 102 fully expands all expandable content for web resources just prior to capturing the web resources. For example, the set of indications the capturing server 102 receives from the client device 120 includes indications for the scheduled capture of multiple Facebook webpages in one week's time. Seven days later, for each Facebook webpage, the capturing server 102 loads the Facebook webpage into the web browser it is executing, fully expands the Facebook webpage, and captures the fully expanded Facebook webpage as a set of images. In a further embodiment, the capturing server 102 continues to automatically expand all web resources it captures for the user 132 until the user 132 specifies otherwise.

To capture the expanded Facebook webpage 908 in real time, the user 132 clicks the capture button 902. This sends an indication to the capturing server 102 to capture the Facebook webpage 908, or any other webpage which might be loaded. The capturing server 102 receives the indication to capture and responsively captures a set of images of the Facebook webpage 908 as it appears on the web browser executing on the capturing server 102.

Where an "onMouseOver" script command is coded into the HTML for a webpage specified by a URL, a user can roll over an object embedded in the webpage to reveal additional web content associated with the object. The user rolls over the object a mouse or other cursor device, and the additional web content is revealed without leaving the specified webpage. This operation is referred to as a "rollover." For different embodiments, rollovers can be allowed or blocked at a user's discretion as the user directs the capturing server 102 to capture a webpage in real time while the user is browsing the webpage. The effect of allowing or blocking a rollover is described in greater detail with respect to FIGS. 10A and 10B.

Figure 10A:
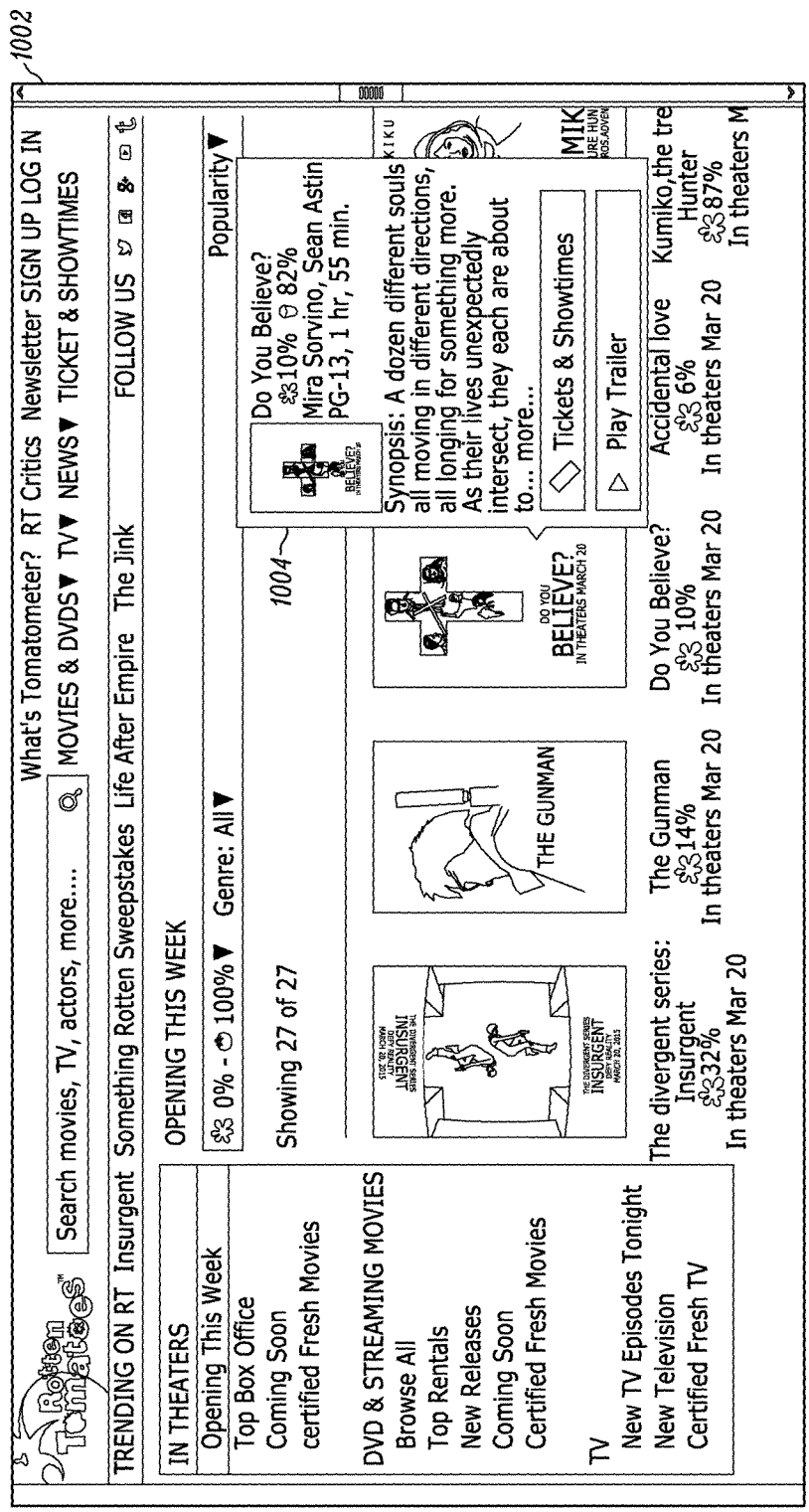
Figure 10B:
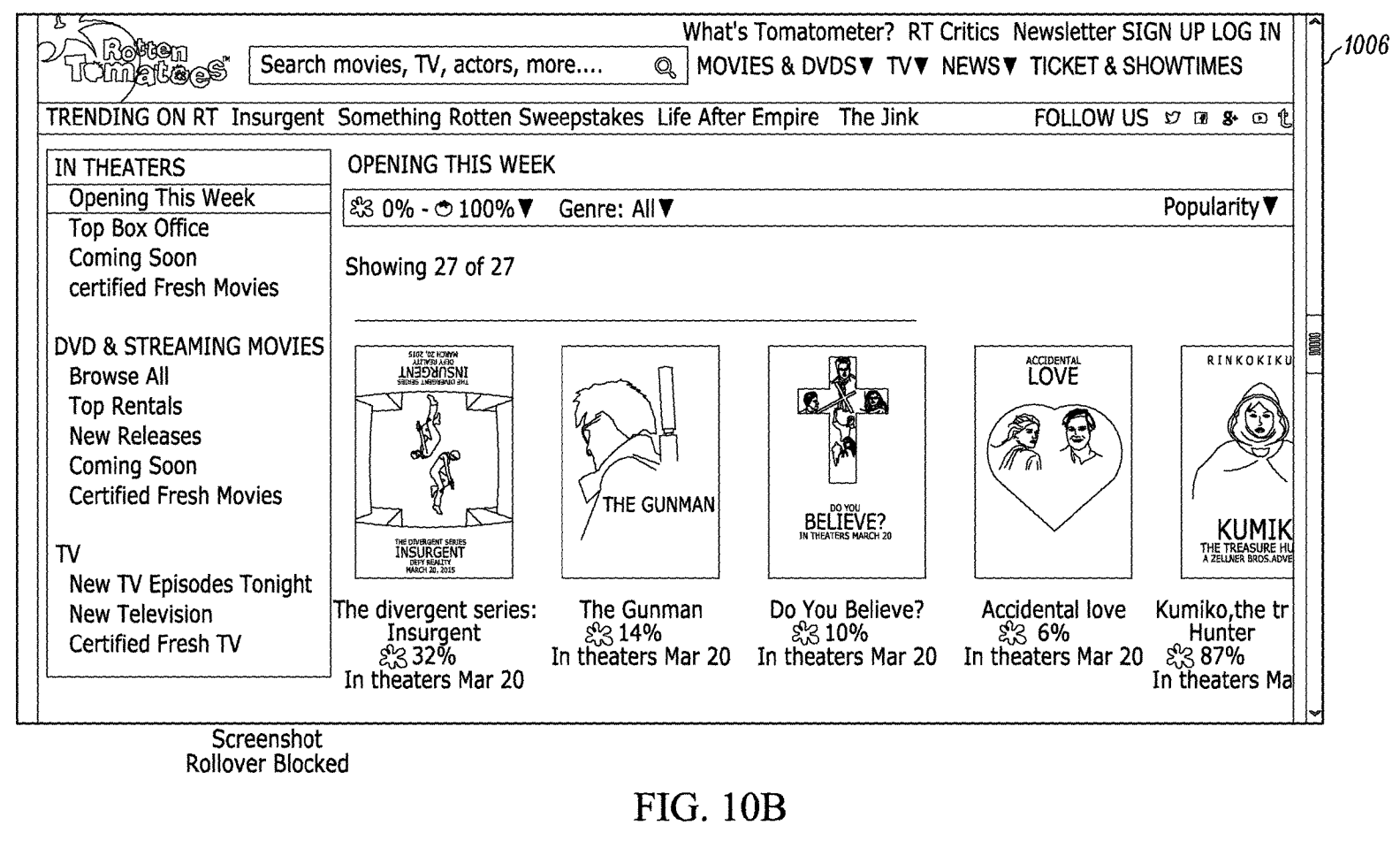

FIGS. 10A and 10B show two screenshots 1002, 1006 representing captured images of a webpage, Rotten Tomatoes, which provides movie reviews. The webpage includes an imbedded picture for each movie displayed. In screenshot 1002, for which rollovers are allowed, a dialogue box 1004 appears as the user 132 rolls his cursor device over the picture for the movie "Do You Believe?" The open dialogue box 1004 completely obscures a picture for a movie "Accidental Love" and also covers a portion of a picture for another movie in the captured screenshot 1002. By blocking rollovers, as shown in the screenshot 1006, the dialog box 1004 does not appear and the pictures for each movie are visible in the resulting capture.

In a group of embodiments for real-time captures, the capturing server 102 blocks at least one interaction of the client device 120 with the web browser executing on the capturing server 102 at the moment the capturing server 102 captures selected web content as a set of images. For example, the capturing server 102 blocks rollovers as just described. Allowing the client device 120 to interact with the web browser when the capturing server 102 is capturing an image of the web browser can change the image as it is being captured.

In a second example for real-time captures, the capturing server 102 blocks input from a peripheral pointing device, such as a mouse, touchpad, or touchscreen, of the client device 120 at the moment of capture. This momentarily blocks the user 132 from scrolling a webpage, clicking on embedded links, or opening new tabs as a visible portion of the webpage is being captured.

In a third example for real-time captures, the capturing server 102 momentarily blocks input from a peripheral data input device, such as a keyboard or microphone, of the client device 120. This blocks the user 132 from entering data into a webpage at the moment of capture. In some instances, an interactive webpage alters its appearance or another webpage is loaded in response to the input of data. Blocking data input prevents this from happening as the capturing server 102 captures an image of the webpage. In different embodiments, the capturing server 102 blocks different types of interactions in different combinations so that no interaction being blocked can alter the appearance of the webpage at the moment the webpage is being captured. For an embodiment, the capturing server 102 blocks or turns off all inbound RCP messaging from the client device 120 as the capturing server 102 captures web content selected for capture by the client device 120. In a further embodiment, the inbound RCP messaging is simply dropped and not buffered.

For some embodiments, the capturing server 102 blocks the client device 120 from uploading content to the web browser executing on the capturing server 102 at any time during a capturing session. In a particular embodiment, the capturing server 102 blocks the client device 120 from uploading content to the web browser executing on the capturing server over the link 128. This is a security measure by which the capturing server 102 maintains the integrity of captured web content, prevents tampering with captured web content, and/or guards against corruption of captured web content. To certify that a capture is an exact representation of web content as hosted by the web server 122, or any combination of web servers, the capturing server 102 safeguards against the client device 120 inserting or injecting any web content into a webpage that is not originally part of the webpage as hosted by the web server 122. In further embodiments, the capturing server 102 also prevents the client device 120 from introducing or changing certain types of metadata associated with a capture. For example, the client device 120 is unable to override or change a timestamp the capturing server 102 places on a captured webpage.

For a number of embodiments, a number of screenshots used to capture a webpage loaded in the web browser executing on the capturing server 102 is proportional to the length of the loaded webpage. A set of images capturing a longer webpage can include multiple screenshots of the webpage, wherein each of the multiple screenshots captures a different portion of the webpage. In a particular embodiment, sequential screenshots of multiple screenshots used to capture a webpage overlap by an amount of overlap. Sequential screenshots are screenshots that capture neighboring or adjacent portions of a webpage, for example, a second portion of the webpage directly below or to the right of a first portion of the webpage.

In capturing as a set of images as a true representation of how a webpage hosted by the web server 122 actually appears, the capturing server 102 implements measures to prevent the insertion of web content that is not originally part of the hosted webpage, as previously described. To provide visual assurance that web content originally included in the webpage has not been omitted from the capture, an amount of overlap is used between sequential screenshots. Overlapping sequential screenshots is described in greater detail with reference to FIGS. 11A and 11B.

Figure 11A:
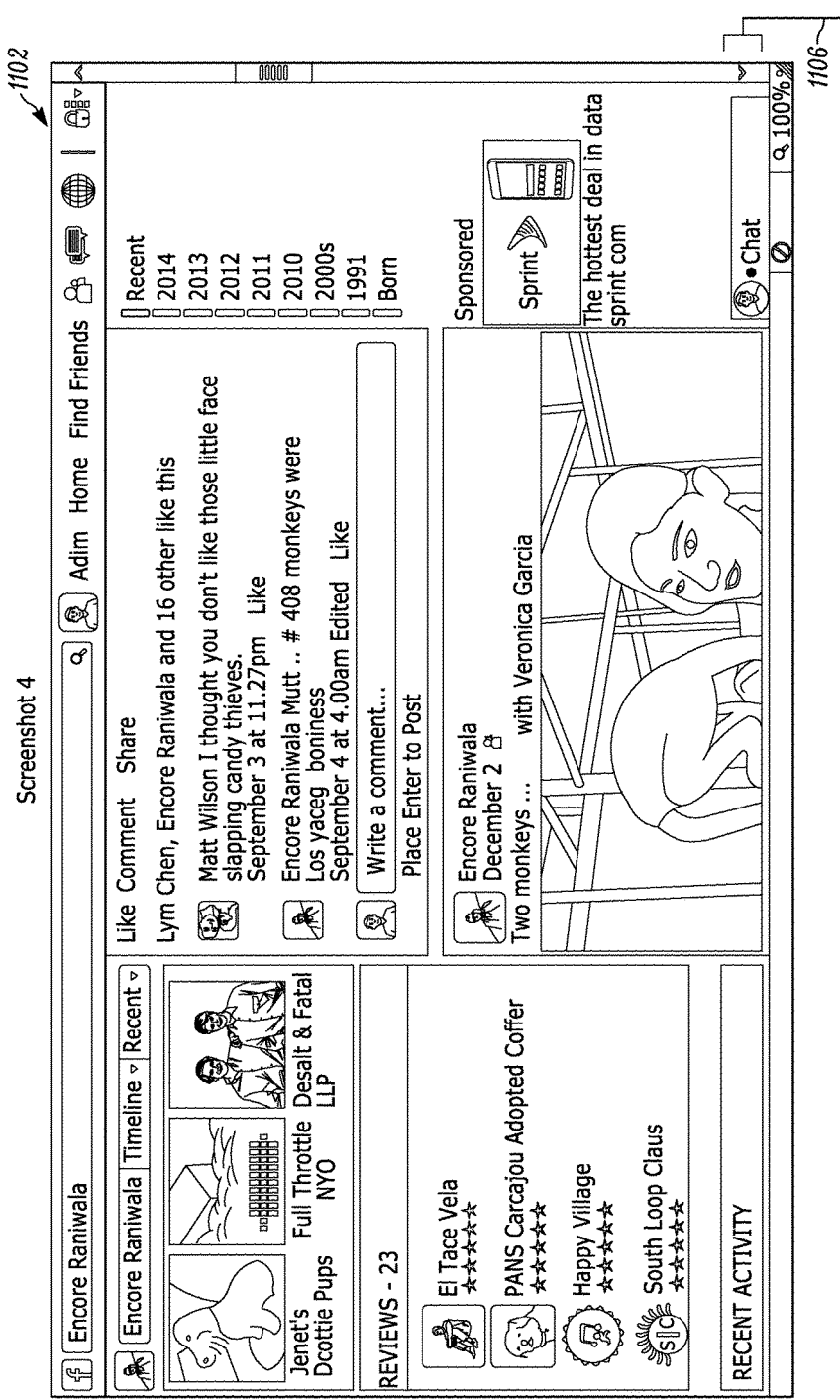
FIGS. 11A and 11B show captured images illustrating the effect of setting an amount of overlap for captures, in accordance with some embodiments.
Figure 11B:
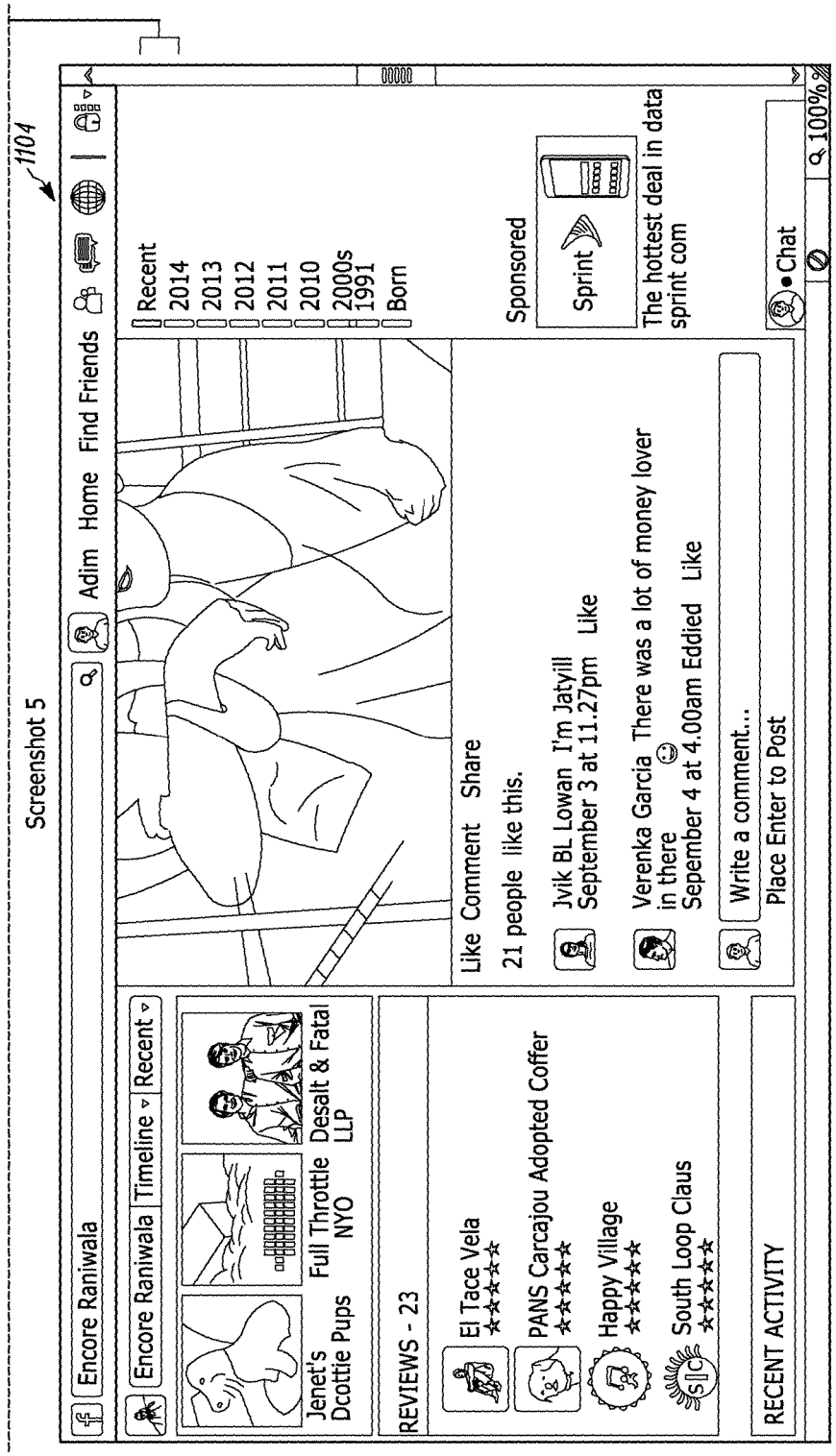

FIGS. 11A and 11B show two sequential screenshots 1102, 1104 of a Facebook webpage captured as a set of images. In particular, the screenshot 1102 captures a fourth portion of the webpage and the screenshot 1104 captures a fifth portion of the webpage immediately below the fourth portion. An amount of overlap between the two sequential screenshots 1102, 1104 is indicated at 1106. Given the amount of overlap shown, the mouth of a young lady holding a monkey on her right arm is captured twice, once at the bottom of screenshot 1102 and again at the top of screenshot 1104. It is visually evident that web content is not omitted from between the screenshots 1102 and 1104, which could be the case if there were a gap between the screenshots 1102, 1104 rather than an amount of overlap 1106.

In a further embodiment, the capturing server 102 receives from the client device 120 over the link 128 an indication of a measure of overlap, wherein the measure of overlap specifies the amount of overlap. For example, the user 132 of the client device 120 specifies no overlap, in which case the sequential screenshots 1102, 1104 would meet flush. If the user 132 specifies a measure of overlap of a half centimeter, then the last half centimeter of the screenshot 1102 and the first half centimeter of the screenshot 1104 will cover the same portion of the webpage being captured. In different embodiments, the measure of overlap can be specified in different ways, inclusive of a number of pixels, in units of distance, or as a percentage of a dimension of a screenshot.

The client device 120 communicates to the capturing server 102 the indication of the measure of overlap the user 132 specifies. The capturing server 102 then loads sequential screens of a webpage being captured with the indicated measure of overlap so that sequential screenshots overlap in accordance with the user's specification. After each screenshot, the capturing server 102 pauses before capturing the next screenshot to allow time for the next screen to load. In some instances, the time for each screen to load can vary depending on specific hardware being used, an amount of data being retrieved, bandwidth, and/or network conditions.

For some embodiments, so that each screen of a webpage finishes loading before capturing that part of the webpage, that capturing server 102 applies a comparative algorithm. The capturing server 102 applies the comparative algorithm to a first portion and a second portion of a webpage selected to be captured in consecutive screenshots. The capturing server 102 then compares a second output of the comparative algorithm for the second portion to a first output of the comparative algorithm for the first portion. The capturing server 102 captures the second portion in a second screenshot after capturing the first portion in a first screenshot in response to the second output not matching the first output. Consecutive screenshots are screenshots that are captured in immediate succession in time, but may or may not capture sequential screens of a webpage. If a second loaded screen of a webpage is not captured, for example, then the screenshots that capture the first and third screens of the webpage become consecutive screenshots because the first and third screens are consecutively captured in time. The application of the comparative algorithm is described in greater detail with reference to FIGS. 12A, 12B, and 12C.

Figure 12A:
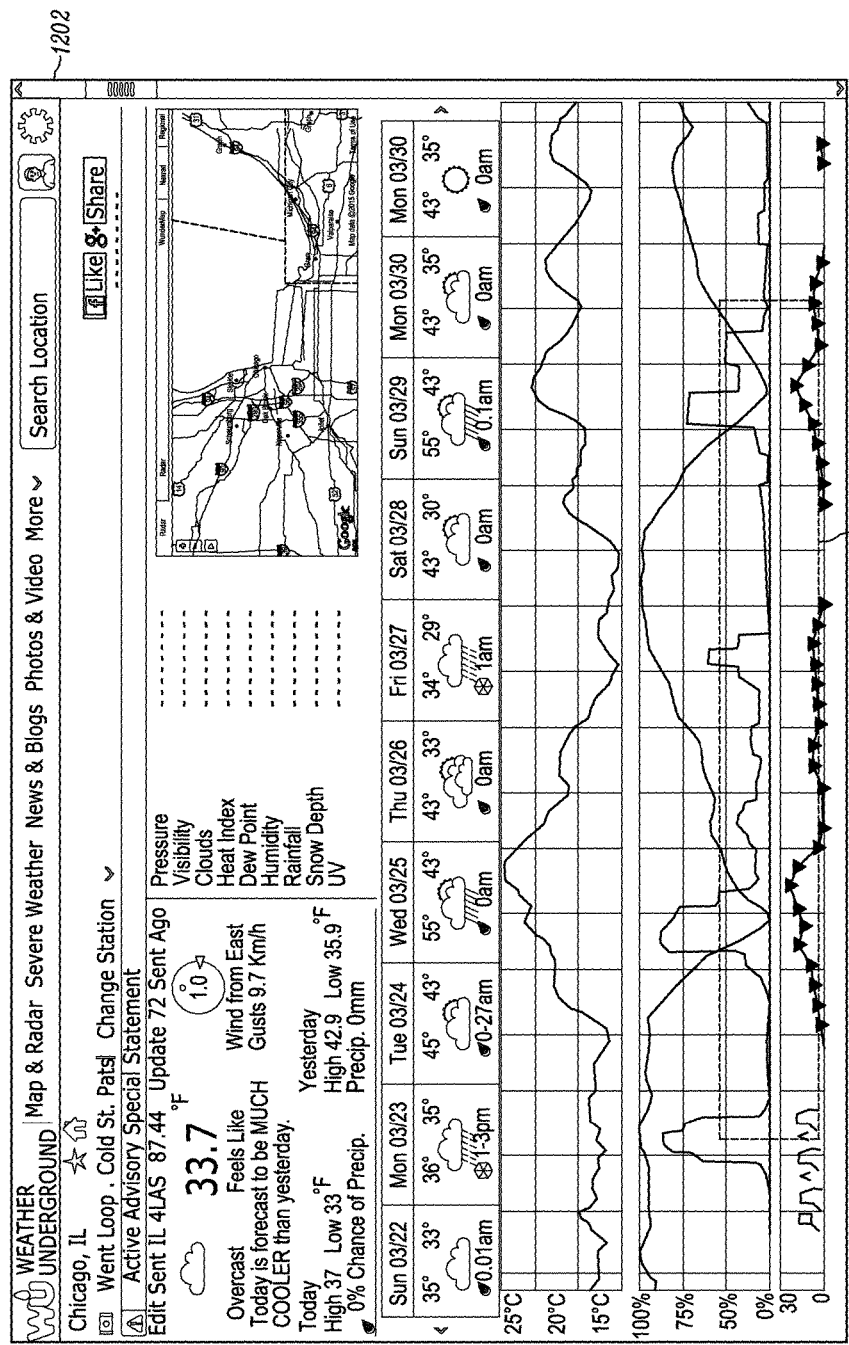
FIGS. 12A, 12B, and 12C show captured images illustrating the effect of applying a comparative algorithm to a pair of portions of a webpage, in accordance with some embodiments.
Figure 12B:
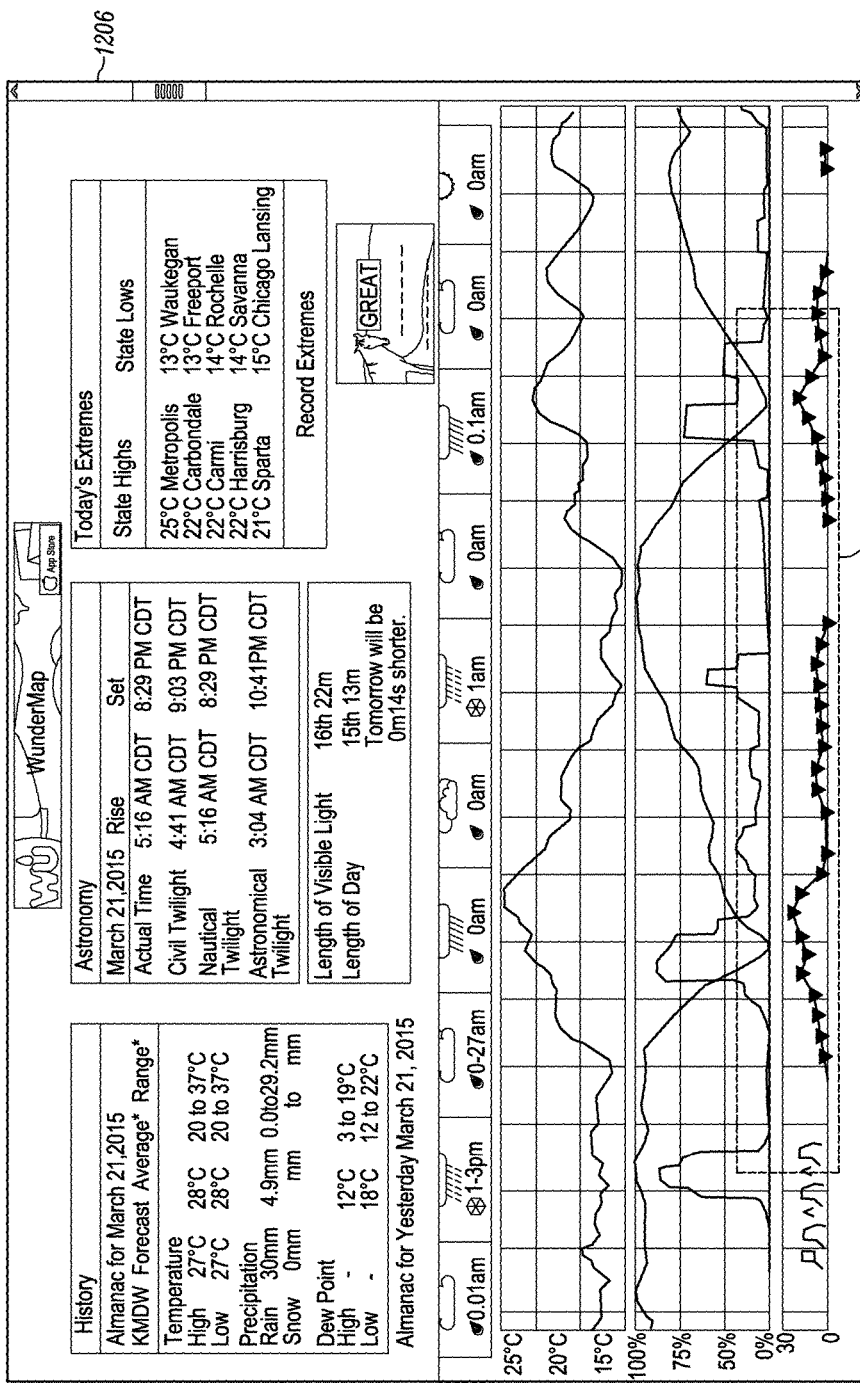
Figure 12C:
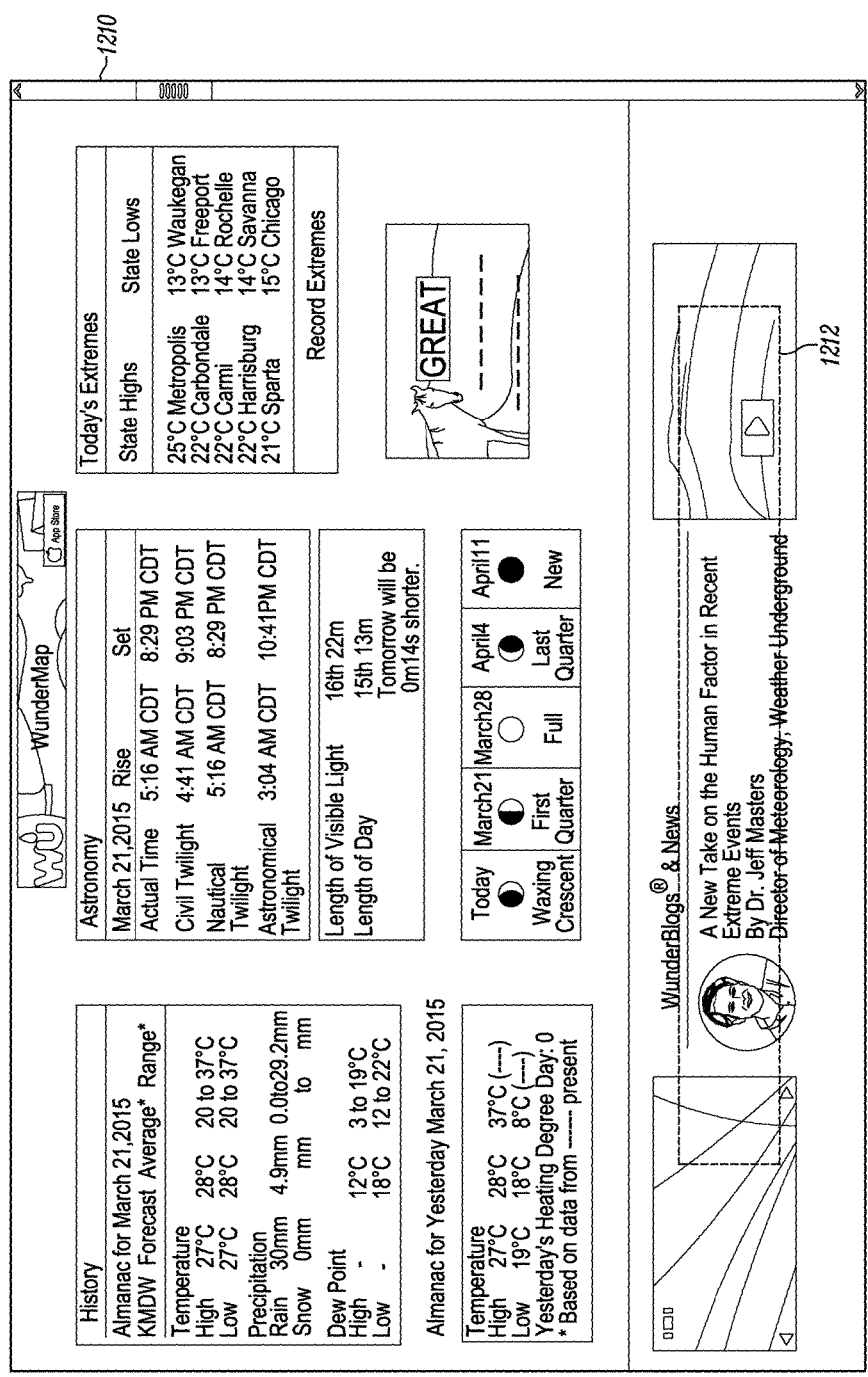

FIGS. 12A, 12B, and 12C show consecutive screenshots 1202, 1206, 1210 of a Weather Underground webpage in various states of loading. A first screen of the webpage is fully loaded and captured by the screenshot 1202. A second screen of the webpage is captured by the screenshot 1206 before it finishes loading. The second screen is captured by the screenshot 1210 after it finishes loading. A first portion of the webpage located on the first screen is indicated at 1204. A second portion of the webpage located on the second screen is indicated at 1208 and also at 1212.

Applying a comparative algorithm to first and second portions of the webpage includes applying the comparative algorithm only to corresponding parts of the first and second portions of the webpage. The first portion of the webpage is shown at 1204 at the bottom of the first screen. The second portion of the webpage shown at 1208 and 1212 is identical in its proportions to the first portion and is located in the identical position on the second screen as the first portion is on the first screen.

The first and second portions of the webpage are located at the bottom of their respective screens. This is because webpages generally load from top to bottom, making the bottom of each screen the last area to load. The first and second portions of the webpage are also wide relative to their height. This is in case any areas on the loaded webpage appear blank, such as a central region between twin columns of text. In a particular embodiment, the first and second portions of the webpage are equal in width to the webpage.

As shown in the screenshot 1206, the second screen was only partially loaded. While the upper area of the screenshot 1206 shows new content, the lower area was not yet loaded and still shows the same content as the screenshot 1202. In particular, the second portion of the webpage indicated at 1208 still shows the identical content to the first portion indicated at 1204. In performing a comparative algorithm on the first and second portions, the capturing server 102 determines that both portions show the same content, indicating that the second screen is not finished loading. The capturing server 102 responsively delays capturing the second screen.

At a later time, the capturing server 102 again compares the first and second portions. As shown in screenshot 1210, the second screen is now fully loaded. Therefore, the second portion of the webpage indicated at 1212 shows different content than the first portion indicated at 1204. In performing the comparative algorithm, the capturing server 102 determines the two portions show different content, indicating the second screen is fully loaded. The capturing server 102 responsively captures the second screen as the screenshot 1210.

For an embodiment, the capturing server 102 uses a hash function in performing its comparison of the two portions.

The capturing server 102 calculates as a first output of the comparative algorithm a first hash value for the first portion of the webpage. The capturing server 102 then calculates as a second output of the comparative algorithm a second hash value for the second portion of the webpage. In determining if the second screen is loaded, the capturing server 102 compares the second output to the first output.

Figure 13A:
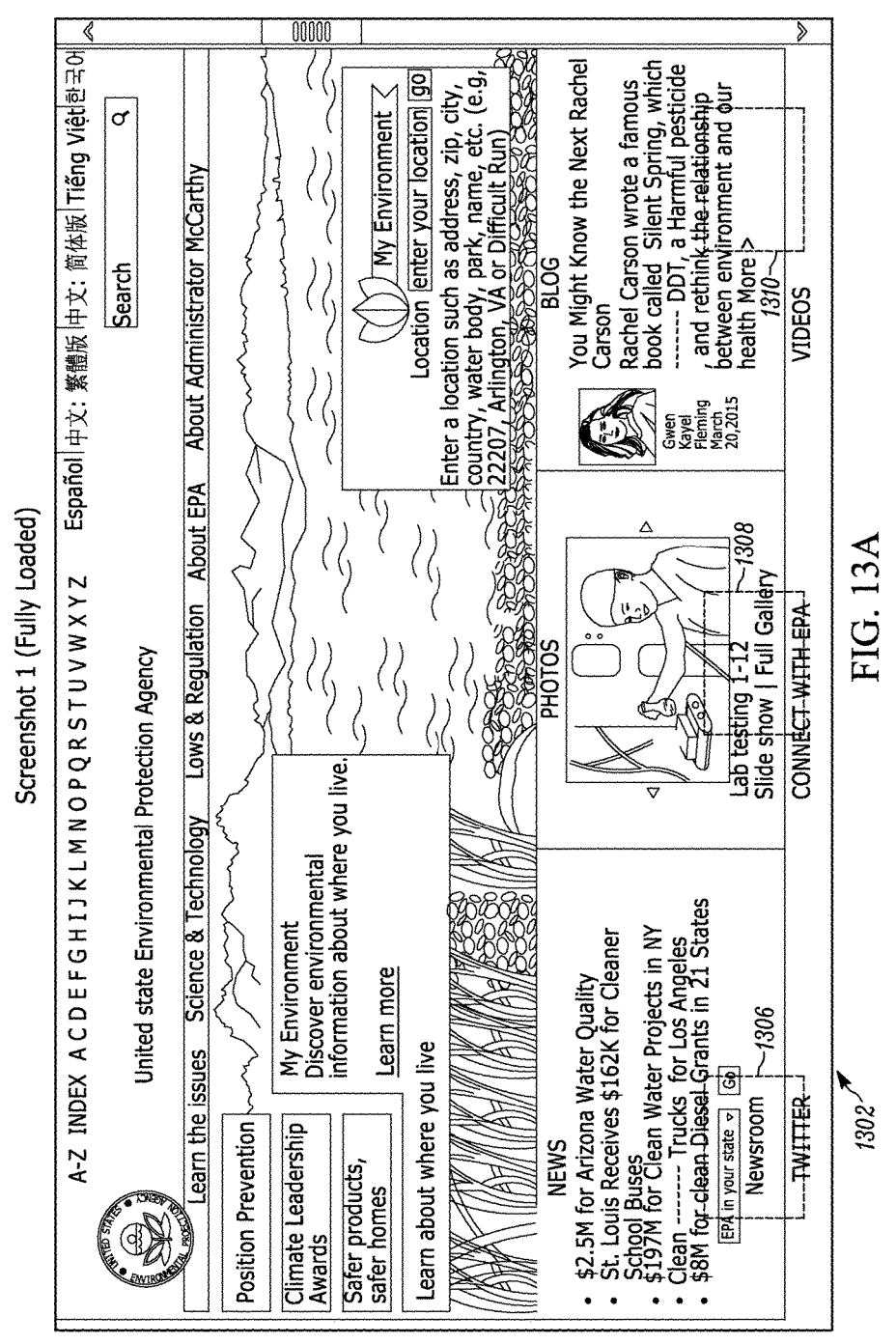
Figure 13B:
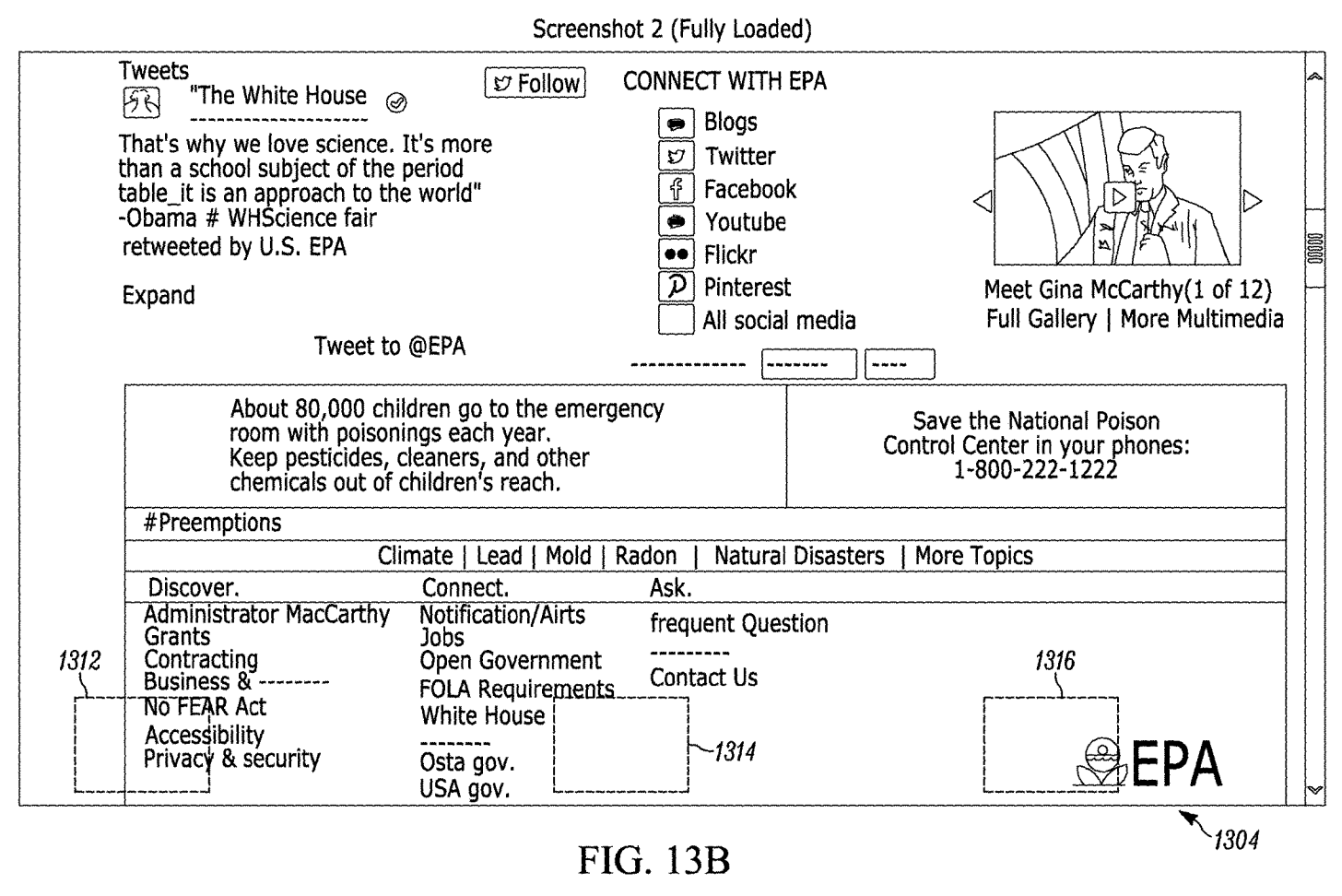

The capturing server 102 can also compare multiple portions of a webpage for each of consecutive screens against one another to determine if a latter screen is fully loaded. FIGS. 13A and 13B show two consecutive screenshots 1302, 1304 of the Environmental Protection Agency's (EPA's) webpage. The screenshot 1302 is of a first screen, and the screenshot 1304 is of a second screen. For the first screen, first, second, and third portions of the EPA's webpage are indicated at 1306, 1308, and 1310, respectively. For the second screen, fourth fifth, and sixth portions of the EPA's webpage are indicated at 1312, 1314, and 1316, respectively.

Having three portions for comparison at the bottom of each screen accommodates different ways webpages can be formatted for display. If a webpage loads with a low zoom setting on a wide-screen display, for example, margins shown on either side of any screen are large. Even with fully loaded screens, the outside portions 1306, 1310, 1312, 1316 will all show the same content if, for instance, margins are solid white. In this case, the centrally located portion 1314 will still show different content than the portion 1308 when a comparison is made, indicating the second screen is fully loaded.

In another example, a webpage is formatted into two columns, and a central region of the webpage between the columns, where portions 1308 and 1314 are located, is formatted to be white. Both the central portions 1308, 1314 will show the same content when the first and second screens are fully loaded. The outside portions 1306, 1310, 1312, 1316, however, will show different content when compared, indicating that the second screen is fully loaded.

For an embodiment in which the capturing server 102 compares multiple pairs of portions between consecutive screens, the capturing server 102 determines a latter of the consecutive screens is loaded when the capturing server 102 determines any one pair of portions has different content loaded for each portion of the pair. For another embodiment, to determine if a screen is fully loaded, the capturing server 102 compares the entire screen against a previous screen.

In some embodiments, the capturing server 102 facilitates the loading of a webpage by scanning the webpage to initiate the loading of objects embedded in the webpage prior to capturing the webpage. This method is useful when a longer webpage cannot be loaded to fit a single screen of a web browser. In some instances, content appearing beyond the first screen is not loaded until the web browser is scrolled down to the screens on which the content appears.

When the capturing server 102 receives from the client device 120 an indication to capture the Weather Underground webpage shown in FIGS. 12A, 12B, and 12C, for example, the capturing server 102 loads the webpage into the web browser the capturing server 102 is executing at the time of capture. Because capturing the webpage as a set of images requires two screenshots, the capturing server 102 scans the entire webpage before capturing the first screenshot. In particular, the capturing server 102 scans the second screen before capturing the first screen so that the second screen will proceed to load in its entirety as the capturing server 102 captures the first screen as a first screenshot.

In a particular embodiment, the capturing server 102 captures a wide and/or long webpage, which would otherwise need to be scrolled to capture using multiple screenshots, in its entirety as a single large image. For example, a display on which a web browser is rendered has a full-HD resolution of 1920-by-1080 pixels. The capturing server, however, captures the entire webpage as a single image having a 4K resolution of 3840-by-2160 pixels. The webpage can be provided to the capturing server 102 for capture in a large-image format, for instance, by using a special application-programming-interface (API) that provides instructions to the capturing server 102 on accessing the web browser.

For some embodiments, the capturing server 102 applies at least one of an electronic signature, a hash function, or a time stamp to captured web content. One philosophy of use is that an application of the present teachings will meet federal, state, and local evidentiary standards for legal proceedings. Rule 901 of the Federal Rules of Evidence (FRE), for example, states that "No satisfy the requirement of authenticating or identifying an item of evidence, [a proponent of the evidence] must produce [supporting] evidence sufficient to support a finding that the item [of evidence] is what the proponent claims it is." FRE 901(b)(9) goes on to state that "[supporting] evidence that satisfies the requirement is [supporting] evidence describing a process or system and showing that it produces an accurate result." Through the application of specific functions and/or procedures to capture web content, the disclosed method for capturing web content from a web server properly identifies and authenticates the captured web content for use in judicial or other types of proceedings for which proffered web content must be validated.

For one embodiment, the capturing server 102, or another component of the capturing system 100, applies an electronic signature to the captured web content. An electronic signature, as defined herein, is any means of marking the captured web content to provide an indication that the capturing server 102, or any other portion of the capturing system 100, is the origin of the captured web content. For a particular embodiment, the electronic signature is a digital signature based on a cryptographic function that includes, for example, a private and a public key, used to authenticate the captured web content to which the electronic signature is applied. In a further embodiment, the capturing server 102 uses the electronic signature to provide non-repudiation.

For another embodiment, the capturing server 102, or another component of the capturing system 100, applies a hash function to the captured web content. A hash function, as defined herein, is the application of an algorithm to the captured web content that generates a unique string of data called a hash value for the captured web content. The hash value changes if the captured web content is accidentally or intentionally changed. Thus, the hash value serves as a "digital fingerprint" for the captured web content and provides an indication of data integrity.

In a further embodiment, the capturing server 102, or another component of the capturing system 100, applies a timestamp to the captured web content. A timestamp, as defined herein, is an indication of when the web content was captured or last modified. Time-stamping the captured web content, for example, provides a "guarantee" that the captured web data was not altered since it was captured by the capturing server 102. For a particular embodiment, time-stamping is based on a public-key infrastructure (PM). In a further embodiment, the capturing server 102 applies a timestamp to the web content at the time the web content is captured during the web browsing session between the capturing server 102 and the web server 122.

In different embodiments, the timestamp indicates when the web content was requested, obtained, and/or captured to the non-volatile storage 116. For a web browsing session, a timestamp can be used for each individual request for data to populate a webpage, whether those requests are directed to a single web server (e.g., web server 122) or to multiple web servers. A timestamp can also be used for each event (e.g., broken links, inaccessible servers, etc.) or action (e.g., clicks, swipes, etc.) that occurs during the web browsing session. In other embodiments, the capturing server 102 uses additional cryptographic functions, independently or in conjunction with those specified here, to authenticate the captured web content.

For various embodiments, the capturing server 102 applies a hash function, a time stamp, and/or an electronic signature, in any combination, to web content, or any portion of the web content, the capturing server 102 is capturing. In a first example, the capturing server applies an electronic signature and a time stamp to a webpage captured from the web server 122. In a second example, the capturing server 122 applies a hash function to an html file for the webpage, an electronic signature to a footer of the webpage, and a time stamp to an embedded image in the webpage.

In other embodiments, the capturing server 102 also captures metadata for captured web content. Metadata is defined herein as data that describes or relates to captured web content. For example, metadata can specify the geographic location at which the web content was captured when the capturing system 100 includes multiple capturing servers and/or non-volatile storage locations (e.g., the Memphis capturing server was used to capture the web content). Metadata can further specify a web server from which the web content was captured using a URL or an IP address. Metadata can also specify which subscriber logged into the capturing system 100 and directed the capturing server 102 to capture the web content. For a particular embodiment, the capturing server 102 captures metadata that specifies at least one of a time for the captured web content or a URL for the captured web content. The time for the captured web content can include a date and/or a time of day.

In a first embodiment, the time indicates the time the client device 120 or the capturing server 102 requests the web content. In a second embodiment, the time indicates the time the capturing server 102 receives the requested web content. In a third embodiment, the time indicates the time the capturing server 102 captures the requested web content. For additional embodiments, the metadata includes times associated with asynchronous requests made to the web server 122 and/or the times of any other identifiable interactions occurring between the capturing server 102 and the web server 122 for which a time can be assigned.

In further embodiments, metadata captured by the capturing server 102 can include, but is not limited to, the IP address of the client device 120, the capturing server 102, the web server 122, and/or the non-volatile storage 116, the geographic location of the subscriber 132 that captured the web content; what web browser was used by the capturing server 102 to capture the web content, what RCP or web browser was used by the client device 120 to direct the capturing server 102 to the captured web content, what states existed in one or more of the web browsers used (e.g., cookies, browser history, software patches installed, etc.), and what server hosted the capturing server 102 as a virtual machine (e.g., GCP, EC2, or Azure). Metadata for captured web content might also include a "surfing" history for a web browser indicating how the web browser arrived at the captured web content or the remotely controlled actions that directed the web browser to the web server 122 and the captured web content.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a capturing server for scheduled capturing of web content, the method comprising:
    establishing a link with a client device;
    receiving over the link from the client device a set of indications for web content to capture and schedule information for capturing the web content, wherein the set of indications for web content to capture includes an indication for a webpage which comprises embedded links to additional webpages not included in the set of indications; and
    performing in accordance with the schedule information:
        establishing a first network connection with a first web server hosting a first web resource of the indicated web content, wherein the first web resource comprises a webpage;
        receiving the first web resource over the first network connection from the first web server without the first web resource being routed through the client device;
        capturing the first web resource as a first set of images of the first web resource loaded into a web browser executing on the capturing server, wherein the first set of images comprises multiple screenshots of the webpage; and each of the multiple screenshots captures a different portion of the webpage; and
        capturing each additional webpage as a set of images of the additional webpage loaded into the web browser executing on the capturing server.

2. The method of claim 1 further comprising performing in accordance with the schedule information:
    establishing a second network connection with a second web server hosting a second web resource of the indicated web content;
    receiving the second web resource over the second network connection from the second web server without the second web resource being routed through the client device; and
    capturing the second web resource as a second set of images of the second web resource loaded into the web browser.

3. The method of claim 1, wherein the set of indications for web content to capture comprises indications for first web content to batch capture, the method further comprising batch capturing the first web content as multiple sets of images.

4. The method of claim 1, wherein:
    the link with the client device allows the client device to remotely control a web browsing session between the capturing server and the web server; and
    the client device uses the web browsing session to select the web content to capture.

5. The method of claim 4, wherein the client device uses the web browsing session to select the web content to capture by indicating web resources to capture as the client device navigates to the web resources.

6. The method of claim 5, wherein the web resources indicated for capture comprises a website.

7. The method of claim 1, wherein:
    the set of indications for web content to capture comprises an indication for a website identifiable by a domain name; and
    capturing the first web resource comprises capturing multiple webpages of the web site having the domain name.

8. The method of claim 1 further comprising expanding the webpage prior to capturing the webpage.

9. The method of claim 1 further comprising blocking the client device from uploading content to the web browser over the link with the client device.

10. The method of claim 1 further comprising blocking at least one interaction of the client device with the web browser at a moment of capturing the first set of images of the first web resource loaded into the web browser.

11. The method of claim 1, wherein sequential screenshots of the multiple screenshots overlap by an amount of overlap.

12. The method of claim 11 further comprising receiving, over the link from the client device, an indication of a measure of overlap, wherein the measure of overlap specifies the amount of overlap.

13. The method of claim 1 further comprising:
    applying a comparative algorithm to a first portion and a second portion of the first web resource indicated for capture as consecutive screenshots;
    comparing a second output of the comparative algorithm for the second portion to a first output of the comparative algorithm for the first portion;
    capturing the second portion after capturing the first portion in response to the second output not matching the first output.

14. The method of claim 13, wherein applying the comparative algorithm to the first and second portions of the first web resource comprises applying the comparative algorithm only to corresponding parts of the first and second portions.

15. The method of claim 1, wherein the first web resource is dynamic web content, and wherein capturing the first web resource as the first set of images comprises capturing the dynamic web content as a video.

16. The method of claim 1, wherein:
  capturing the first web resource includes capturing the client device interacting with the first web resource; and
  capturing the first web resource as the first set of images comprises capturing the first web resource as a video.

17. The method of claim 1, wherein the first web resource includes audio content, and wherein capturing the first web resource includes capturing the audio content.

18. A capturing server configured to schedule capture of web content, the capturing server comprising:
  a first network interface configured to establish a link with a client device;
  a second network interface configured to establish a first network connection with a web server; and
  a processing element operatively coupled to the first and second network interfaces, wherein the processing element is configured to:
    establish the link with a client device;
    receive over the link from the client device a set of indications for web content to capture and schedule information for capturing the web content, wherein the set of indications for web content to capture includes an indication for a webpage which comprises embedded links to additional webpages not included in the set of indications; and
    perform in accordance with the schedule information:
      establish the first network connection with the web server hosting a web resource of the indicated web content, wherein the web resource comprises a webpage;
      receive the web resource over the first network connection from the web server without the web resource being routed through the client device;
      capture the web resource as a set of images of the web resource loaded into a web browser executing on the capturing server, wherein the set of images comprises multiple screenshots of the webpage; and each of the multiple screenshots captures a different portion of the webpage: and
      capture each additional webpage as a set of images of the additional webpage loaded into the web browser executing on the capturing server.

19. The capturing server of claim 18 further comprising a third network interface configured to establish a second network connection to a network storage device remotely located from both the capturing server and the client device, wherein the processing element is further configured to:
  establish the second network connection between the network storage device and the capturing server; and
  send the captured web resource over the second network connection for storing on the network storage device.

* * * * *